US009153125B2

(12) United States Patent
Madonna et al.

(10) Patent No.: US 9,153,125 B2
(45) Date of Patent: Oct. 6, 2015

(54) PROGRAMMABLE MULTIMEDIA CONTROLLER WITH PROGRAMMABLE SERVICES

(75) Inventors: Robert P. Madonna, Osterville, MA (US); Kevin C. Kicklighter, Hyannis, MA (US); Michael C. Silva, Centerville, MA (US); Bryan S. Bonczek, Osterville, MA (US); Arthur A. Jacobson, Osterville, MA (US)

(73) Assignee: Savant Systems, LLC, Hyannis, MA (US)

( * ) Notice: Subject to any disclaimer, the term of this patent is extended or adjusted under 35 U.S.C. 154(b) by 1573 days.

(21) Appl. No.: 11/314,112

(22) Filed: Dec. 20, 2005

(65) Prior Publication Data

US 2007/0142022 A1 Jun. 21, 2007

(51) Int. Cl.

| | |
|---|---|
| ***H04L 12/66*** | (2006.01) |
| ***G08C 17/02*** | (2006.01) |
| ***H04N 7/16*** | (2011.01) |
| ***H04N 21/41*** | (2011.01) |
| ***H04N 21/436*** | (2011.01) |
| ***H04N 21/443*** | (2011.01) |
| ***H04L 29/08*** | (2006.01) |
| *G06F 15/16* | (2006.01) |
| *H04N 7/10* | (2006.01) |
| *H04N 7/025* | (2006.01) |
| *H04N 7/18* | (2006.01) |
| *H04N 7/173* | (2011.01) |

(52) U.S. Cl.

CPC .............. *G08C 17/02* (2013.01); *H04L 67/025* (2013.01); *H04N 7/163* (2013.01); *H04N 21/4104* (2013.01); *H04N 21/43615* (2013.01); *H04N 21/4431* (2013.01); *G08C 2201/93* (2013.01)

(58) Field of Classification Search

USPC ............... 370/352; 725/82, 105, 35; 717/172; 709/217

See application file for complete search history.

(56) References Cited

U.S. PATENT DOCUMENTS

| | | | |
|---|---|---|---|
| 2001/0011284 A1 | 8/2001 | Humpleman et al. | |
| 2003/0101459 A1* | 5/2003 | Edson | 725/82 |
| 2004/0059716 A1* | 3/2004 | Shiraishi et al. | 707/1 |
| 2004/0261116 A1 | 12/2004 | Mckeown et al. | |
| 2004/0267914 A1 | 12/2004 | Roe et al. | |
| 2005/0074018 A1* | 4/2005 | Zintel et al. | 370/401 |
| 2005/0125564 A1 | 6/2005 | Bushmitch et al. | |
| 2005/0251747 A1* | 11/2005 | Dolling et al. | 715/713 |
| 2008/0126936 A1* | 5/2008 | Williams | 715/717 |

FOREIGN PATENT DOCUMENTS

| | | |
|---|---|---|
| EP | 1355485 | 10/2003 |
| WO | WO-99/06910 A1 | 2/1999 |
| WO | WO 2005/010740 | 11/2005 |

OTHER PUBLICATIONS

International Search Report for PCT/US2006/048655.

(Continued)

*Primary Examiner* — Asad Nawaz
*Assistant Examiner* — Stephanie Chang
(74) *Attorney, Agent, or Firm* — Cesari and McKenna, LLP

(57) ABSTRACT

An integrated multimedia, entertainment, communications and control system. The system is based on a general purpose computer and is capable of interfacing with, controlling or managing a wide variety of audio, video, telecommunications, data communications or other devices. The system includes a programming environment for creating services or user experiences that may incorporate features or functionalities of several devices that are conventionally operated as separate, standalone devices.

22 Claims, 42 Drawing Sheets

(56) References Cited

OTHER PUBLICATIONS

Nishiyma, et al., "Next Generation Home Network Service: Operation Service Coordination Technique Designed for Home Network Operation Support," NTT Gijutsu Journal, Japan, The Telecommunications Association, Nov. 1, 2004, vol. 16, No. 11, pp. 16-19.

"DME Designer Version 2.0: Owner's Manual," Yamaha Corporation, 2004, pp. 1-482.

* cited by examiner

```
  <?xml version="1.0" encoding="UTF-8" ?>
  <!-- <!DOCTYPE component SYSTEM "./racepoint_component_profile.dtd"> -->
- <component xmlns:xsi="http://www.w3.org/2001/XMLSchema-instance"
   xsi:noNamespaceSchemaLocation="racepoint_component_profile.xsd"
   manufacturer="Integra" model="DPS-5.5" device_class="DVD_player"
   minimum_component_engine_version="0">
  - <control_interfaces preferred="rs232">
    - <rs232 data_length="8" parity_bit="no" stop_bit="1" flow_control="none"
        name_on_component="RS232" preferred_baud_rate="9600"
        response_time_length_ms="1000">
        <baud_rate speed="9600" />
        <send_prefix type="character">!2</send_prefix>
        <send_postfix type="hex">0d</send_postfix>
        <receive_start_condition type="character">!2</receive_start_condition>
        <receive_end_condition type="hex"
          test_condition="data">1A</receive_end_condition>
        <!-- EOF -->
    -   <response_codes>
          <!-- For turning off status indications only for now -->
          <rspcode status="success">SPM00</rspcode>
          <!-- All other response codes assumed failure -->
        </response_codes>
      </rs232>
    </control_interfaces>
- <media_interfaces>
  - <output name_on_component="AUDIO OUTPUT DIGITAL">
        <audio_media type="coaxial_digital" />
        <audio_media type="optical_digital" />
        <resource resource_type="AV_DVD_SOURCE" />
        <resource resource_type="AV_CD_SOURCE" />
    </output>
  - <output name_on_component="AUDIO OUTPUT ANALOG">
        <audio_media type="rca_stereo" />
        <audio_media type="rca_stereo" />
        <resource resource_type="AV_DVD_SOURCE" />
        <resource resource_type="AV_CD_SOURCE" />
    </output>
  - <output name_on_component="VIDEO OUTPUT COMPONENT">
        <video_media type="component_bnc" />
        <video_media type="component_coaxial" />
        <resource resource_type="AV_DVD_SOURCE" />
    </output>
  - <output name_on_component="VIDEO OUTPUT VIDEO (LEFT)">
        <video_media type="composite" />
        <video_media type="s_video" />
        <resource resource_type="AV_DVD_SOURCE" />
    </output>
  - <output name_on_component="VIDEO OUTPUT VIDEO (RIGHT)">
        <video_media type="composite" />
        <video_media type="s_video" />
        <resource resource_type="AV_DVD_SOURCE" />
    </output>
```

500 (rs232 block), 502 (audio outputs), 504 (video outputs)

FIG. 5A

```
  </media_interfaces>
- <state_variable_list>
    <state_variable name="Power_current_power_setting" min_value="0"
      max_value="1">0</state_variable>
  </state_variable_list>
- <status_notification_list>
  - <status_notification name="DEVICE_STATUS">
       <status update_type="constant" data="SST00"
         data_type="character">STANDBY</status>
       <status update_type="constant" data="SST01" data_type="character"
         svc_event_name="dvdStartedPlaying">PLAYBACK</status>
       <status update_type="constant"
         data="SST02" data_type="character">PAUSE</status>
       <status update_type="constant"
         data="SST03" data_type="character">STOP</status>
       <status update_type="constant"
         data="SSTFF" data_type="character">UNKNOWN</status>
    </status_notification>
  - <status_notification name="CURRENT_DISC_TYPE">
       <status update_type="constant" data="DST00" data_type="character">NO
         DISC</status>
       <status update_type="constant" data="DST01" data_type="character"
         svc_event_name="dvdInsert">DVD</status>
       <status update_type="constant" data="DST03" data_type="character"
         svc_event_name="vcdInsert">VCD</status>
       <status update_type="constant" data="DST04" data_type="character"
         svc_event_name="cdInsert">CD</status>
       <status update_type="constant" data="DST07"
         data_type="character">DATA</status>
       <status update_type="constant" data="DSTFF"
         data_type="character">UNKNOWN</status>
    </status_notification>
  - <status_notification name="DIMMER_LEVEL">
       <status update_type="constant" data="MST00"
         data_type="character">BRIGHT</status>
       <status update_type="constant" data="MST01"
         data_type="character">MEDIUM</status>
       <status update_type="constant" data="MST02"
         data_type="character">DIM</status>
       <status update_type="constant" data="MST03"
         data_type="character">UNKNOWN</status>
  - </status_notification>
    <status_notification name="PROGRESSIVE_VIDEO">
       <status update_type="constant" data="PST00"
         data_type="character">OFF</status>
       <status update_type="constant" data="PST01"
         data_type="character">ON</status>
       <status update_type="constant" data="PSTFF"
         data_type="character">UNKNOWN</status>
    </status_notification>
  </status_notification_list>
- <logical_component logical_component_name="CD_DVD Player">
  - <implementation>
```

```
    <output name_on_component="AUDIO OUTPUT DIGITAL" />
    <output name_on_component="AUDIO OUTPUT ANALOG" />
    <output name_on_component="VIDEO OUTPUT COMPONENT" />
    <output name_on_component="VIDEO OUTPUT VIDEO (LEFT)" />
    <output name_on_component="VIDEO OUTPUT VIDEO (RIGHT)" />
 </implementation>
- <implementation>
    <output name_on_component="AUDIO OUTPUT DIGITAL" />
    <output name_on_component="AUDIO OUTPUT ANALOG" />
 </implementation>
- <universal_component_actions>
  - <action name="PowerOn">
      <execute_on_state_variable_condition
       name="Power_current_power_setting"
       test_condition="not_equal">1</execute_on_state_variable_condition>
      <update_state_variable name="Power_current_power_setting"
       update_type="set"
       update_source="constant">1</update_state_variable>
    - <command_interface interface="rs232">
      - <command response_required="no">
          <command_string>PWR</command_string>
        - <parameter_list>
            <parameter name="power_setting"
             parameter_data_width="2" parameter_total_width="2"
             parameter_justify="right" parameter_fill=""
             parameter_data_type="character">1</parameter>
          </parameter_list>
          <delay ms_delay="0" />
        </command>
      </command_interface>
    </action>
- <action name="PowerOff">
  - <!-- Always attempt to power off, regardless of state -->
    <update_state_variable name="Power_current_power_setting"
     update_type="set"
     update_source="constant">0</update_state_variable>
  - <command_interface interface="rs232">
    - <command response_required="no">
        <command_string>PWR</command_string>
      - <parameter_list>
          <parameter name="power_setting"
           parameter_data_width="2" parameter_total_width="2"
           parameter_justify="right" parameter_fill=""
           parameter_data_type="character">0</parameter>
        </parameter_list>
        <delay ms_delay="0" />
      </command>
    </command_interface>
 </action>
</universal_component_actions>
<!-- This device implements the DVD_SOURCE and CD_SOURCE resource types -->
```

510 (first five output lines and </implementation>)

512 (PowerOn action)

514 (PowerOff action)

FIG. 5C

```
- <resource_component_actions resource_type="AV_DVD_SOURCE">
- <action name="TrayOpen">
  - <command_interface interface="rs232">
    - <command response_required="no">
        <command_string>OPC</command_string>
        <delay ms_delay="0"/>
      </command>
    </command_interface>
  </action>
- <action name="TrayClose">
  - <command_interface interface="rs232">
    - <command response_required="no">
        <command_string>OPC</command_string>
        <delay ms_delay="0"/>
      </command>
    </command_interface>
  </action>
- <action name="OSDCursorUp">
  - <command_interface interface="rs232">
    - <command response_required="no">
        <command_string>OSD</command_string>
      - <parameter_list>
          <parameter name="cursor" parameter_data_width="2"
           parameter_total_width="2" parameter_justify="right"
           parameter_fill=""
           parameter_data_type="character">UP</parameter>
        </parameter_list>
        <delay ms_delay="0"/>
      </command>
    </command_interface>
  </action>
- <action name="OSDCursorDown">
  - <command_interface interface="rs232">
    - <command response_required="no">
        <command_string>OSD</command_string>
      - <parameter_list>
          <parameter name="cursor" parameter_data_width="2"
           parameter_total_width="2" parameter_justify="right"
           parameter_fill=""
           parameter_data_type="character">DN</parameter>
        </parameter_list>
        <delay ms_delay="0"/>
      </command>
    </command_interface>
  </action>
- <action name="OSDCursorLeft">
  - <command_interface interface="rs232">
    - <command response_required="no">
        <command_string>OSD</command_string>
      - <parameter_list>
          <parameter name="cursor" parameter_data_width="2"
           parameter_total_width="2" parameter_justify="right"
```

FIG. 5D

```
            parameter_fill=""
                    parameter_data_type="character">LF</parameter>
          </parameter_list>
          <delay ms_delay="0"/>
        </command>
      </command_interface>
    </action>
  - <action name="OSDCursorRight">
    - <command_interface interface="rs232">
      - <command response_required="no">
          <command_string>OSD</command_string>
        - <parameter_list>
            <parameter name="cursor" parameter_data_width="2"
             parameter_total_width="2" parameter_justify="right"
             parameter_fill=""
             parameter_data_type="character">RH</parameter>
          </parameter_list>
          <delay ms_delay="0"/>
        </command>
      </command_interface>
    </action>
  - <action name="CommandEnter">
    - <command_interface interface="rs232">
      - <command response_required="no">
          <command_string>ENT</command_string>
          <delay ms_delay="0"/>
        </command>
      </command_interface>
    </action>
  - <action name="CommandReturn">
    - <command_interface interface="rs232">
      - <command response_required="no">
          <command_string>RET</command_string>
          <delay ms_delay="0"/>
        </command>
      </command_interface>
    </action>
  - <action name="CommandSetup">
    - <command_interface interface="rs232">
      - <command response_required="no">
          <command_string>SUP</command_string>
          <delay ms_delay="0"/>
        </command>
      </command_interface>
    </action>
  - <action name="CommandMenu">
    - <command_interface interface="rs232">
      - <command response_required="no">
          <command_string>MNU</command_string>
          <delay ms_delay="0"/>
        </command>
      </command_interface>
```

FIG. 5E

```
  </action>
- <action name="CommandTitle">
  - <command_interface interface="rs232">
    - <command response_required="no">
        <command_string>TMN</command_string>
        <delay ms_delay="0"/>
      </command>
    </command_interface>
  </action>
- <action name="CommandDisplay">
  - <command_interface interface="rs232">
    - <command response_required="no">
        <command_string>DSP</command_string>
        <delay ms_delay="0"/>
      </command>
    </command_interface>
  </action>
- <action name="CommandAngle">
  - <command_interface interface="rs232">
    - <command response_required="no">
        <command_string>ANG</command_string>
        <delay ms_delay="0"/>
      </command>
    </command_interface>
  </action>
- <action name="CommandAudio">
  - <command_interface interface="rs232">
    - <command response_required="no">
        <command_string>AUD</command_string>
        <delay ms_delay="0"/>
      </command>
    </command_interface>
  </action>
- <action name="CommandSubtitle">
  - <command_interface interface="rs232">
    - <command response_required="no">
        <command_string>SUB</command_string>
        <delay ms_delay="0"/>
      </command>
    </command_interface>
  </action>
- <action name="CommandPlay">
  - <command_interface interface="rs232">
    - <command response_required="no">
        <command_string>PLY</command_string>
      - <parameter_list>
          <parameter name="play" parameter_data_width="2"
          parameter_total_width="2" parameter_justify="right"
            parameter_fill=""
            parameter_data_type="character">UP</parameter>
        </parameter_list>
        <delay ms_delay="0"/>
```

```
        </command>
      </command_interface>
    </action>
  - <action name="CommandStop">
    - <command_interface interface="rs232">
      - <command response_required="no">
          <command_string>STP</command_string>
          <delay ms_delay="0"/>
        </command>
      </command_interface>
    </action>
  - <action name="CommandPause">
    - <command_interface interface="rs232">
      - <command response_required="no">
          <command_string>PAS</command_string>
          <delay ms_delay="0"/>
        </command>
      </command_interface>
    </action>
  - <action name="CommandSkipUp">
    - <command_interface interface="rs232">
      - <command response_required="no">
          <command_string>SKP</command_string>
        - <parameter_list>
            <parameter  name="direction"  parameter_data_width="2"
           parameter_total_width="2"  parameter_justify="right"
           parameter_fill=""
           parameter_data_type="character">UP</parameter>
          </parameter_list>
          <delay ms_delay="0"/>
        </command>
      </command_interface>
    </action>
  - <action name="CommandSkipDown">
    - <command_interface interface="rs232">
      - <command response_required="no">
          <command_string>SKP</command_string>
        - <parameter_list>
          <parameter  name="direction"  parameter_data_width="2"
           parameter_total_width="2"  parameter_justify="right"
           parameter_fill=""
           parameter_data_type="character">DN</parameter>
          </parameter_list>
          <delay ms_delay="0"/>
        </command>
      </command_interface>
    </action>
  - <action name="CommandScanUp">
    - <command_interface interface="rs232">
      - <command response_required="no">
          <command_string>SCN</command_string>
        - <parameter_list>
```

FIG. 5G

```
          <parameter name="direction" parameter_data_width="2"
            parameter_total_width="2" parameter_justify="right"
            parameter_fill=""
            parameter_data_type="character">UP</parameter>
        </parameter_list>
        <delay ms_delay="0"/>
      </command>
    </command_interface>
  </action>
- <action name="CommandScanDown">
  - <command_interface interface="rs232">
    - <command response_required="no">
        <command_string>SCN</command_string>
        <parameter_list>
          <parameter name="direction" parameter_data_width="2"
            parameter_total_width="2" parameter_justify="right"
            parameter_fill=""
            parameter_data_type="character">DN</parameter>
        </parameter_list>
        <delay ms_delay="0"/>
      </command>
    </command_interface>
  </action>
- <action name="CommandStepUp">
  - <command_interface interface="rs232">
    - <command response_required="no">
        <command_string>PST</command_string>
      - <parameter_list>
          <parameter name="direction" parameter_data_width="2"
            parameter_total_width="2" parameter_justify="right"
            parameter_fill=""
            parameter_data_type="character">UP</parameter>
        </parameter_list>
        <delay ms_delay="0"/>
      </command>
    </command_interface>
    </action>
- <action name="ToggleZoom">
  - <command_interface interface="rs232">
    - <command response_required="no">
        <command_string>ZOM</command_string>
        - <parameter_list>
            <parameter name="toggle" parameter_data_width="2"
              parameter_total_width="2" parameter_justify="right"
              parameter_fill=""
              parameter_data_type="character">TU</parameter>
          </parameter_list>
        <delay ms_delay="0"/>
      </command>
    </command_interface>
  </action>
- <action name="CommandStepDown">
  - <command_interface interface="rs232">
```

FIG. 5H

```
        - <command response_required="no">
            <command_string>PST</command_string>
          - <parameter_list>
              <parameter name="direction" parameter_data_width="2"
                  parameter_total_width="2" parameter_justify="right"
                  parameter_fill=""
                  parameter_data_type="character">DN</parameter>
            </parameter_list>
            <delay ms_delay="0"/>
          </command>
        </command_interface>
      </action>
    </resource_component_actions>
  - <resource_component_actions resource_type="AV_CD_SOURCE">
    - <action name="CommandPlay">
      - <command_interface interface="rs232">
        - <command response_required="yes">
            <command_string>PMS</command_string>
          - <parameter_list>
              <parameter name="status_mode_setting"
                parameter_data_width="2" parameter_total_width="2"
                parameter_justify="right" parameter_fill=""
                parameter_data_type="character">0</parameter>
            </parameter_list>
            <delay ms_delay="0"/>
          </command>
        - <command response_required="no">
            <command_string>PLY</command_string>
          - <parameter_list>
              <parameter name="play" parameter_data_width="2"
                parameter_total_width="2" parameter_justify="right"
                parameter_fill=""
                parameter_data_type="character">EN</parameter>
            </parameter_list>
            <delay ms_delay="0"/>
          </command>
        </command_interface>
      </action>
    - <action name="CommandPause">
      - <command_interface interface="rs232">
        - <command response_required="yes">
            <command_string>PMS</command_string>
          - <parameter_list>
              <parameter name="status_mode_setting"
                parameter_data_width="2" parameter_total_width="2"
                parameter_justify="right" parameter_fill=""
                parameter_data_type="character">0</parameter>
            </parameter_list>
            <delay ms_delay="0"/>
          </command>
        - <command response_required="no">
            <command_string>PAS</command_string>
```

FIG. 5I

```
        <delay ms_delay="0"  />
      </command>
    </command_interface>
  </action>
- <action name="CommandScanDown">
  - <command_interface interface="rs232">
    - <command response_required="yes">
        <command_string>PMS</command_string>
      - <parameter_list>
          <parameter name="status_mode_setting"
            parameter_data_width="2" parameter_total_width="2"
            parameter_justify="right" parameter_fill=""
            parameter_data_type="character">0</parameter>
        </parameter_list>
        <delay ms_delay="0"  />
      </command>
    - <command response_required="no">
        <command_string>SCN</command_string>
      - <parameter_list>
          <parameter  name="scan"  parameter_data_width="2"
            parameter_total_width="2"  parameter_justify="right"
            parameter_fill=""
            parameter_data_type="character">DN</parameter>
        </parameter_list>
        <delay ms_delay="0"/>
      </command>
    </command_interface>
  </action>
- <action name="CommandScanUp">
  - <command_interface interface="rs232">
    - <command response_required="yes">
        <command_string>PMS</command_string>
      - <parameter_list>
          <parameter name="status_mode_setting"
            parameter_data_width="2" parameter_total_width="2"
            parameter_justify="right" parameter_fill=""
            parameter_data_type="character">0</parameter>
        </parameter_list>
        <delay ms_delay="0"/>
      </command>
    - <command response_required="no">
        <command_string>SCN</command_string>
      - <parameter_list>
          <parameter  name="scan"  parameter_data_width="2"
            parameter_total_width="2"  parameter_justify="right"
            parameter_fill=""
            parameter_data_type="character">UP</parameter>
        </parameter_list>
        <delay ms_delay="0"/>
      </command>
    </command_interface>
  </action>
- <action name="CommandSkipDown">
```

FIG. 5J

```
- <command_interface interface="rs232">
  - <command response_required="yes">
      <command_string>PMS</command_string>
    - <parameter_list>
        <parameter name="status_mode_setting"
          parameter_data_width="2" parameter_total_width="2"
          parameter_justify="right" parameter_fill=""
          parameter_data_type="character">0</parameter>
      </parameter_list>
      <delay ms_delay="0"/>
    </command>
  - <command response_required="no">
      <command_string>SKP</command_string>
    - <parameter_list>
        <parameter  name="skip"  parameter_data_width="2"
          parameter_total_width="2"  parameter_justify="right"
          parameter_fill=""
          parameter_data_type="character">DN</parameter>
      </parameter_list>
      <delay ms_delay="0"/>
    </command>
  </command_interface>
</action>
- <action name="CommandSkipUp">
  - <command_interface interface="rs232">
    - <command response_required="yes">
        <command_string>PMS</command_string>
      - <parameter_list>
          <parameter name="status_mode_setting"
            parameter_data_width="2" parameter_total_width="2"
            parameter_justify="right" parameter_fill=""
            parameter_data_type="character">0</parameter>
        </parameter_list>
        <delay ms_delay="0"/>
      </command>
    - <command response_required="no">
        <command_string>SKP</command_string>
      - <parameter_list>
          <parameter  name="skip"  parameter_data_width="2"
            parameter_total_width="2"  parameter_justify="right"
            parameter_fill=""
            parameter_data_type="character">UP</parameter>
        </parameter_list>
        <delay ms_delay="0"/>
      </command>
    </command_interface>
  </action>
- <action name="CommandStop">
  - <command_interface interface="rs232">
    - <command response_required="yes">
        <command_string>PMS</command_string>
      - <parameter_list>
          <parameter name="status_mode_setting"
```

FIG. 5K

```
        parameter_data_width="2" parameter_total_width="2"
          parameter_justify="right" parameter_fill=""
          parameter_data_type="character">0</parameter>
      </parameter_list>
      <delay ms_delay="0"/>
    </command>
  - <command response_required="no">
      <command_string>STP</command_string>
      <delay ms_delay="0"/>
    </command>
  </command_interface>
</action>
- <action name="ToggleRandom">
  - <command_interface interface="rs232">
    - <command response_required="yes">
        <command_string>PMS</command_string>
      - <parameter_list>
          <parameter name="status_mode_setting"
            parameter_data_width="2" parameter_total_width="2"
            parameter_justify="right" parameter_fill=""
            parameter_data_type="character">0</parameter>
        </parameter_list>
        <delay ms_delay="0"/>
      </command>
    - <command response_required="no">
        <command_string>RND</command_string>
        <delay ms_delay="0"/>
      </command>
    </command_interface>
  </action>
- <action name="ToggleRepeat">
  - <command_interface interface="rs232">
    - <command response_required="no">
        <command_string>RPT</command_string>
        <delay ms_delay="0"/>
      </command>
    </command_interface>
  </action>
- <action name="TrayOpen">
  - <command_interface interface="rs232">
    - <command response_required="no">
        <command_string>OPC</command_string>
        <delay ms_delay="0"/>
      </command>
    </command_interface>
  </action>
- <action name="TrayClose">
  - <command_interface interface="rs232">
    - <command response_required="no">
        <command_string>OPC</command_string>
        <delay ms_delay="0"/>
      </command>
```

FIG. 5L

</command_interface>
</action>
</resource_component_actions>
</logical_component>
</component>

FIG. 5M

```xml
<?xml version="1.0" encoding="UTF-8"?>
<zone_config xmlns:xsi="http://www.w3.org/2001/XMLSchema-instance"
  xsi:noNamespaceSchemaLocation="zoneConfig.xsd">
  <zone_master manufacturer="Integra" model="DTR-10.5"
    zone_master_name="IntegraReceiver">
    <module_config>                                                    ⎫
      <module model="C-LINK" slot="A"/>
      <module model="C-NET-A" slot="B"/>
      <module model="Digital Audio" slot="CD"/>
      <module model="C-MULTI" slot="E"/>
      <module model="Audio IN" slot="FG"/>                             ⎬ 600
      <module model="Video IN" slot="HI"/>
      <module model="C-CPNT-RCA" slot="J"/>
      <module model="Antenna IN" slot="K"/>
      <module model="C-HDMI" slot="L"/>
    </module_config>                                                   ⎭
    <logical_io_assign logical_name="DVD">                             ⎫
      <io model="Audio IN" slot="FG" name_on_component="Stereo IN 1"/> ⎬ 602
      <io model="Video IN" slot="HI" name_on_component="Component IN 1"/>
    </logical_io_assign>                                               ⎭
    <logical_io_assign logical_name="Video 1">                         ⎫
      <io model="Audio IN" slot="FG" name_on_component="Stereo IN 2"/> ⎬ 604
      <io model="Video IN" slot="HI" name_on_component="Component IN 2"/>
    </logical_io_assign>                                               ⎭
    <logical_io_assign logical_name="Main Zone">
      <io name_on_component="Speakers A"/>
      <io model="C-CPNT-RCA" slot="J" name_on_component="Component Video
        OUT"/>
    </logical_io_assign>
  </zone_master>
  <zone name="Lab" type="user">                                        ⎫
    <zone_master manufacturer="Integra" model="DTR-10.5"
      logical_component_name="Main Zone"
      zone_master_name="IntegraReceiver"/>
    <component_list>
      <component manufacturer="NEC" model="px-42xr3a"
        user_defined_name="PlasmaTV" isShared="false" type="HD_monitor"/>
      <component manufacturer="Integra" model="DPS-5.5"
        user_defined_name="IntegraDVD" isShared="false" type="DVD_player"/> ⎬ 606
      <component manufacturer="Motorola" model="62000"
        user_defined_name="MotorolaCableBox" isShared="false"
        type="Cable_box"/>
      <component manufacturer="BayAudio" model="surroundSpeakers"
        user_defined_name="SurrSpeakers" isShared="false"
        type="Surround_speaker_system"/>
    </component_list>
  </zone>                                                              ⎭
</zone_config>
```

FIG. 6

```
<?xml version="1.0" encoding="UTF-8"?>
- <connection_definitions xmlns:xsi="http://www.w3.org/2001/XMLSchema-instance"
    xsi:noNamespaceSchemaLocation="connection_definitions.xsd">
  - <component user_defined_name="IntegraReceiver">
    - <input model="Audio IN" slot="FG" name_on_component="Stereo IN 1">
      - <audio_media type="rca_stereo">
        - <connection>
          - <peer_io user_defined_name="IntegraDVD"
              name_on_component="AUDIO OUTPUT ANALOG">
              <audio_media type="rca_stereo"/>                          700
            </peer_io>
          </connection>
        </audio_media>
      </input>
    - <input model="Audio IN" slot="FG" name_on_component="Stereo IN 2">
      - <audio_media type="rca_stereo">
        - <connection>
          - <peer_io user_defined_name="MotorolaCableBox"
              name_on_component="AUDIO OUT">
              <audio_media type="rca_stereo"/>                          702
            </peer_io>
          </connection>
        </audio_media>
      </input>
    - <input model="Video IN" slot="HI" name_on_component="Component IN 1">
      - <video_media type="component_coaxial">
        - <connection>
          - <peer_io user_defined_name="IntegraDVD"
              name_on_component="VIDEO OUTPUT COMPONENT">
              <video_media type="component_coaxial"/>                   704
            </peer_io>
          </connection>
        </video_media>
      </input>
    - <input model="Video IN" slot="HI" name_on_component="Component IN 2">
      - <video_media type="component_coaxial">
        - <connection>
          - <peer_io user_defined_name="MotorolaCableBox"
              name_on_component="VIDEO OUT">
              <video_media type="component_coaxial"/>                   706
            </peer_io>
          </connection>
        </video_media>
      </input>
    - <output model="C-CPNT-RCA" slot="J" name_on_component="Component
        Video OUT">
      - <video_media type="component_coaxial">
        - <connection>
          - <peer_io user_defined_name="PlasmaTV"                       708
              name_on_component="DVD1/HD1">
              <video_media type="component_coaxial"/>
            </peer_io>
```

FIG. 7A

```
      </connection>
        </video_media>
      </output>
    - <output name_on_component="Speakers A">
      - <audio_media type="speakers_7.1_surround">
        - <connection>
          - <peer_io user_defined_name="SurrSpeakers">
              <audio_media type="speakers_7.1_surround"/>            710
            </peer_io>
          </connection>
        </audio_media>
      </output>
    - <control manufacturer="integra" model="DTR-10.5">
        <rs232_control device_path="/dev/tty.USA19H5b13P1.1"/>       712
      </control>
    </component>
  - <component user_defined_name="PlasmaTV">
    - <input name_on_component="DVD1/HD1">
      - <video_media type="component_coaxial">
        - <connection>
          - <peer_io user_defined_name="IntegraReceiver" model="C-CPNT-
            RCA" slot="J" name_on_component="Component Video OUT">
              <video_media type="component_coaxial"/>
            </peer_io>
          </connection>
        </video_media>
      </input>
    - <control manufacturer="nec" model="px-42xr3a">
        <rs232_control device_path="/dev/tty.USA19H5b13P1.1"/>       714
      </control>
    </component>
  - <component user_defined_name="IntegraDVD">
    - <output name_on_component="AUDIO OUTPUT ANALOG">
      - <audio_media type="rca_stereo">
        - <connection>
          - <peer_io user_defined_name="IntegraReceiver" model="Audio IN"
            slot="FG" name_on_component="Stereo IN 1">
              <audio_media type="rca_stereo"/>
            </peer_io>
          </connection>
        </audio_media>
      </output>
    - <output name_on_component="VIDEO OUTPUT COMPONENT">
      - <video_media type="component_coaxial">
        - <connection>
          - <peer_io user_defined_name="IntegraReceiver" model="Video IN"
            slot="HI" name_on_component="Component IN 1">
              <video_media type="component_coaxial"/>
            </peer_io>
          </connection>
        </video_media>
      </output>
```

FIG. 7B

```
    - <control manufacturer="integra" model="DPS-5.5">
        <rs232_control device_path="dev/tty.USA19H5b12P1.1"/>
      </control>
    </component>
  - <component user_defined_name="MotorolaCableBox">
    - <output name_on_component="AUDIO OUT">
      - <audio_media type="rca_stereo">
        - <connection>
          - <peer_io user_defined_name="IntegraReceiver" model="Audio IN"
              slot="FG" name_on_component="Stereo IN 2">
              <audio_media type="rca_stereo"/>
            </peer_io>
          </connection>
        </audio_media>
      </output>
    - <output name_on_component="VIDEO OUT">
      - <video_media type="component_coaxial">
        - <connection>
          - <peer_io user_defined_name="IntegraReceiver" model="Video IN"
              slot="HI" name_on_component="Component IN 2">
              <video_media type="component_coaxial"/>
            </peer_io>
          </connection>
        </video_media>
      </output>
    - <control manufacturer="motorola" model="62000">
        <ir_control global_cache_ip_address="192.168.2.101"
        global_cache_connector_address="4:3"/>
      </control>
    </component>
  - <component user_defined_name="SurrSpeakers">
    - <input>
      - <audio_media type="speakers_7.1_surround">
        - <connection>
          - <peer_io user_defined_name="IntegraReceiver"
              name_on_component="Speakers A">
              <audio_media type="speakers_7.1_surround"/>
            </peer_io>
          </connection>
        </audio_media>
      </input>
    </component>
</connection_definitions>
```

FIG. 7C

```
<!-- ======================= -->
<!-- Radio Service Definition -->
<!-- ======================= -->
- <service service_type="SVC_AV_RADIO">
  - <audio>
    - <implementation>
        <resource resource_type="AV_RADIO_SOURCE"/>
        <resource resource_type="AV_AUDIOSWITCH_FUNCTION"
          required="no"/>
        <resource
          resource_type="AV_SURROUNDSOUNDPROCESSOR_FUNCTION"/>
        <resource resource_type="AV_VOLUMECONTROL_FUNCTION"
          order="loose"/>
        <resource resource_type="AV_AMPLIFIER_FUNCTION"/>
        <resource resource_type="AV_SURROUNDSOUNDSPEAKERS_SINK"/>
      </implementation>
    - <implementation>
        <resource resource_type="AV_RADIO_SOURCE"/>
        <resource resource_type="AV_AUDIOSWITCH_FUNCTION"
          required="no"/>
        <resource resource_type="AV_VOLUMECONTROL_FUNCTION"
          order="loose"/>
        <resource resource_type="AV_AMPLIFIER_FUNCTION"/>
        <resource resource_type="AV_STEREOSPEAKERS_SINK"/>
      </implementation>
    </audio>                                                        } 800
    <!-- Universal requests -->
  - <request name="PowerOn" from_state="inactive" to_state="active">
    - <all_resources command_order="forward">
        <action name="PowerOn"/>
        <action special="set_input"/>
        <action special="set_output"/>
      </all_resources>
    </request>                                                      } 802
  - <request name="PowerOff" from_state="active" to_state="inactive">
    - <all_resources command_order="reverse">
        <action name="PowerOff"/>
      </all_resources>
    </request>
    <!-- Volume control requests -->
  - <request name="VolumeUp" from_state="active">
    - <resources>
        <resource resource_type="AV_VOLUMECONTROL_FUNCTION"/>       } 804
        <action name="IncreaseVolume"/>
      </resources>
```

FIG. 8A

```
  </request>
- <request name="VolumeDown" from_state="active">
  - <resources>
      <resource resource_type="AV_VOLUMECONTROL_FUNCTION"/>
      <action name="DecreaseVolume"></action>
    </resources>
  </request>
- <request name="MuteOn" from_state="active">
  - <resources>
      <resource resource_type="AV_VOLUMECONTROL_FUNCTION"/>
      <action name="MuteOn"></action>
    </resources>
  </request>
- <request name="MuteOff" from_state="active">                      804
  - <resources>
      <resource resource_type="AV_VOLUMECONTROL_FUNCTION"/>
      <action name="MuteOff"></action>
    </resources>
  </request>
- <request name="SetVolume" from_state="active">
    <arg name="VolumeValue"/>
  - <resources>
      <resource resource_type="AV_VOLUMECONTROL_FUNCTION"/>
      <action name="SetVolume">
        <arg name="VolumeValue"/>
      </action>
    </resources>
  </request>
  <!-- Surround Sound requests -->
- <request name="SetListeningModeTTHX" from_state="active">
  - <resources>
      <resource
        resource_type="AV_SURROUNDSOUNDPROCESSOR_FUNCTION"/>
      <action name="SetListeningModeTTHX"/>
    </resources>
  </request>
- <request name="SetListeningModeAction" from_state="active">
  - <resources>
      <resource
        resource_type="AV_SURROUNDSOUNDPROCESSOR_FUNCTION"/>      806
      <action name="SetListeningModeAction"/>
    </resources>
  </request>
- <request name="SetListeningModeMusical" from_state="active">
  - <resources>
      <resource
        resource_type="AV_SURROUNDSOUNDPROCESSOR_FUNCTION"/>
      <action name="SetListeningModeMusical"/>
    </resources>
  </request>
- <request name="SetListeningModeMonoMovie" from_state="active">
  - <resources>
```

FIG. 8B

```
        <resource
          resource_type="AV_SURROUNDSOUNDPROCESSOR_FUNCTION"/>
        <action name="SetListeningModeMonoMovie"/>
      </resources>
    </request>
  - <request name="SetListeningModeOrchestra" from_state="active">
    - <resources>
        <resource
          resource_type="AV_SURROUNDSOUNDPROCESSOR_FUNCTION"/>
        <action name="SetListeningModeOrchestra"/>
      </resources>
    </request>
  - <request name="SetListeningModeUnplugged" from_state="active">
    - <resources>
        <resource
          resource_type="AV_SURROUNDSOUNDPROCESSOR_FUNCTION"/>
        <action name="SetListeningModeUnplugged"/>
      </resources>
    </request>
  - <request name="SetListeningModeStudioMix" from_state="active">
    - <resources>
        <resource
          resource_type="AV_SURROUNDSOUNDPROCESSOR_FUNCTION"/>
        <action name="SetListeningModeStudioMix"/>
      </resources>
    </request>
  - <request name="SetListeningModeTVLogic" from_state="active">
    - <resources>
        <resource
          resource_type="AV_SURROUNDSOUNDPROCESSOR_FUNCTION"/>
        <action name="SetListeningModeTVLogic"/>
      </resources>
    </request>
  - <request name="SetListeningModeAllChannelStereo" from_state="active">
    - <resources>
        <resource
          resource_type="AV_SURROUNDSOUNDPROCESSOR_FUNCTION"/>
        <action name="SetListeningModeAllChannelStereo"/>
      </resources>
    </request>
  - <request name="SetListeningTheaterListening" from_state="active">
    - <resources>
        <resource
          resource_type="AV_SURROUNDSOUNDPROCESSOR_FUNCTION"/>
        <action name="SetListeningTheaterListening"/>
      </resources>
    </request>
  - <request name="SetListeningModeEnhanced7" from_state="active">
    - <resources>
        <resource
          resource_type="AV_SURROUNDSOUNDPROCESSOR_FUNCTION"/>
        <action name="SetListeningModeEnhanced7"/>
```

FIG. 8C

```
    </resources>
  </request>
- <request name="SetListeningModeMono" from_state="active">
  - <resources>
      <resource
        resource_type="AV_SURROUNDSOUNDPROCESSOR_FUNCTION"/>
      <action name="SetListeningModeMono"/>
    </resources>
  </request>
- <request name="SetListeningModePureAudio" from_state="active">
  - <resources>
      <resource
        resource_type="AV_SURROUNDSOUNDPROCESSOR_FUNCTION"/>
      <action name="SetListeningModePureAudio"/>
    </resources>
  </request>
- <request name="SetListeningModeMultiplex" from_state="active">          806
  - <resources>
      <resource
        resource_type="AV_SURROUNDSOUNDPROCESSOR_FUNCTION"/>
      <action name="SetListeningModeMultiplex"/>
    </resources>
  </request>
- <request name="SetListeningModeFullMono" from_state="active">
  - <resources>
      <resource
        resource_type="AV_SURROUNDSOUNDPROCESSOR_FUNCTION"/>
      <action name="SetListeningModeFullMono"/>
    </resources>
  </request>
- <request name="SetListeningModeDolbyVirtual" from_state="active">
  - <resources>
      <resource
        resource_type="AV_SURROUNDSOUNDPROCESSOR_FUNCTION"/>
      <action name="SetListeningModeDolbyVirtual"/>
    </resources>
  </request>
- <request name="SetListeningMode5.1ChannelSurround" from_state="active">
  - <resources>
      <resource
        resource_type="AV_SURROUNDSOUNDPROCESSOR_FUNCTION"/>
      <action name="SetListeningMode5.1ChannelSurround"/>
    </resources>
  </request>
- <request name="SetListeningModeDolbyEX" from_state="active">
  - <resources>
      <resource
       resource_type="AV_SURROUNDSOUNDPROCESSOR_FUNCTION"/>
      <action name="SetListeningModeDolbyEX"/>
    </resources>
  </request>
  - <request name="SetListeningModeTHXCinema" from_state="active">
```

FIG. 8D

```xml
- <resources>
    <resource
      resource_type="AV_SURROUNDSOUNDPROCESSOR_FUNCTION"/>
    <action name="SetListeningModeTHXCinema"/>
  </resources>
</request>
- <request name="SetListeningModeTHXSurroundEX" from_state="active">
  - <resources>
    <resource
      resource_type="AV_SURROUNDSOUNDPROCESSOR_FUNCTION"/>
    <action name="SetListeningModeTHXSurroundEX"/>
  </resources>
</request>
- <request name="SetListeningModeU2Cinema" from_state="active">
  - <resources>
    <resource
      resource_type="AV_SURROUNDSOUNDPROCESSOR_FUNCTION"/>
    <action name="SetListeningModeU2Cinema"/>
  </resources>
</request>
- <request name="SetListeningModeMusicMode" from_state="active">            806
  - <resources>
    <resource
      resource_type="AV_SURROUNDSOUNDPROCESSOR_FUNCTION"/>
    <action name="SetListeningModeMusicMode"/>
  </resources>
</request>
- <request name="SetListeningModeGamesMode" from_state="active">
  - <resources>
    <resource
      resource_type="AV_SURROUNDSOUNDPROCESSOR_FUNCTION"/>
    <action name="SetListeningModeGamesMode"/>
  </resources>
</request>
- <request name="SetListeningModePLIIPLIIXMovie" from_state="active">
  - <resources>
    <resource
      resource_type="AV_SURROUNDSOUNDPROCESSOR_FUNCTION"/>
    <action name="SetListeningModePLIIPLIIXMovie"/>
  </resources>
</request>
- <request name="SetListeningModePLIIPLIXMusic" from_state="active">
  - <resources>
    <resource
      resource_type="AV_SURROUNDSOUNDPROCESSOR_FUNCTION"/>
    <action name="SetListeningModePLIIPLIXMusic"/>
  </resources>
</request>
- <request name="SetListeningModeNeo6Cinema" from_state="active">
  - <resources>
    <resource
      resource_type="AV_SURROUNDSOUNDPROCESSOR_FUNCTION"/>
```

FIG. 8E

```
        <action name="SetListeningModeNeo6Cinema"/>
      </resources>
    </request>
  - <request name="SetListeningModeNeo6Music" from_state="active">
    - <resources>
        <resource
          resource_type="AV_SURROUNDSOUNDPROCESSOR_FUNCTION"/>
        <action name="SetListeningModeNeo6Music"/>
      </resources>
    </request>
  - <request name="SetListeningModePLIIPLIIXTHXCinema"
      from_state="active">
    - <resources>
        <resource
          resource_type="AV_SURROUNDSOUNDPROCESSOR_FUNCTION"/>
        <action name="SetListeningModePLIIPLIIXTHXCinema"/>
      </resources>
    </request>
  - <request name="SetListeningModeneo6THXCinema" from_state="active">
    - <resources>
        <resource
          resource_type="AV_SURROUNDSOUNDPROCESSOR_FUNCTION"/>
        <action name="SetListeningModeneo6THXCinema"/>
      </resources>
    </request>
  - <request name="SetListeningModePLIIPLIIXGame" from_state="active">
    - <resources>
        <resource
          resource_type="AV_SURROUNDSOUNDPROCESSOR_FUNCTION"/>
        <action name="SetListeningModePLIIPLIIXGame"/>
      </resources>
    </request>
  - <request name="IncrementListeningMode" from_state="active">
    - <resources>
        <resource
          resource_type="AV_SURROUNDSOUNDPROCESSOR_FUNCTION"/>
        <action name="IncrementListeningMode"/>
      </resources>
    </request>
  - <request name="DecrementListeningMode" from_state="active">
    - <resources>
        <resource
          resource_type="AV_SURROUNDSOUNDPROCESSOR_FUNCTION"/>
        <action name="DecrementListeningMode"/>
      </resources>
    </request>
    <!-- Radio Source requests -->
  - <request name="SetRadioFrequency" from_state="active">
    - <resources>
        <resource resource_type="AV_RADIO_SOURCE"/>
        <action name="SetRadioFrequency"/>
      </resources>
```

```
 </request>
- <request name="IncrementRadioFrequency" from_state="active">
  - <resources>
      <resource resource_type="AV_RADIO_SOURCE"/>
      <action name="IncrementRadioFrequency"/>
    </resources>
  </request>
- <request name="DecrementRadioFrequency" from_state="active">
  - <resources>
      <resource resource_type="AV_RADIO_SOURCE"/>
      <action name="DecrementRadioFrequency"/>
    </resources>
  </request>
- <request name="SelectPreset" from_state="active">
  - <resources>
      <resource resource_type="AV_RADIO_SOURCE"/>
      <action name="SelectPreset"/>
    </resources>
  </request>
- <request name="IncrementPreset" from_state="active">
  - <resources>
      <resource resource_type="AV_RADIO_SOURCE"/>
      <action name="IncrementPreset"/>
    </resources>
  </request>
- <request name="DecrementPreset" from_state="active">
  - <resources>
      <resource resource_type="AV_RADIO_SOURCE"/>
      <action name="DecrementPreset"/>
    </resources>
  </request>
- <request name="DisplayRDSRTInfo" from_state="active">
  - <resources>
      <resource resource_type="AV_RADIO_SOURCE"/>
      <action name="DisplayRDSRTInfo"/>
    </resources>
  </request>
- <request name="DisplayRDSPTYInfo" from_state="active">
  - <resources>
      <resource resource_type="AV_RADIO_SOURCE"/>
      <action name="DisplayRDSPTYInfo"/>
    </resources>
  </request>
- <request name="DisplayRDSTPInfo" from_state="active">
  - <resources>
      <resource resource_type="AV_RADIO_SOURCE"/>
      <action name="DisplayRDSTPInfo"/>
    </resources>
  </request>
- <request name="IncrementRDSInfo" from_state="active">
  - <resources>
      <resource resource_type="AV_RADIO_SOURCE"/>
```

```xml
        <action name="IncrementRDSInfo"/>
      </resources>
    </request>
  - <request name="ScanPTY" from_state="active">
    - <resources>
        <resource resource_type="AV_RADIO_SOURCE"/>
        <action name="ScanPTY"/>
      </resources>
    </request>
  - <request name="FinishPTY" from_state="active">
    - <resources>
        <resource resource_type="AV_RADIO_SOURCE"/>
        <action name="FinishPTY"/>
      </resources>
    </request>
  - <request name="ScanTP" from_state="active">
    - <resources>
        <resource resource_type="AV_RADIO_SOURCE"/>
        <action name="ScanTP"/>
      </resources>
    </request>
  - <request name="FinishTP" from_state="active">
    - <resources>
        <resource resource_type="AV_RADIO_SOURCE"/>
        <action name="FinishTP"/>
      </resources>
    </request>
</service>
```
} 808

FIG. 8H

```
<?xml version="1.0" encoding="UTF-8"?>
- <defined_services xmlns:xsi="http://www.w3.org/2001/XMLSchema-instance"
    xsi:noNamespaceSchemaLocation="serviceImplementation.xsd">
  - <zone name="Lab" type="user">
    - <service service_type="SVC_AV_CD" source_component_name="IntegraDVD"
        source_logical_component="CD_DVD Player">
      - <audio>
        - <resource type="component" manufacturer="Integra" model="DPS-5.5"
            user_defined_name="IntegraDVD" resource_type="AV_CD_SOURCE">
          - <output logical_component="CD_DVD Player"
              name_on_component="AUDIO OUTPUT ANALOG">
              <audio_media type="rca_stereo"/>
            </output>
          </resource>
        - <resource type="component" manufacturer="Integra" model="DTR-
            10.5" user_defined_name="IntegraReceiver"
            resource_type="AV_AUDIOSWITCH_FUNCTION">
          - <input logical_component="Main Zone" slot_id="FG"
              model_name="Audio IN" name_on_component="Stereo IN 1">
              <audio_media type="rca_stereo"/>
            </input>
          </resource>
        - <resource type="component" manufacturer="Integra" model="DTR-
            10.5" user_defined_name="IntegraReceiver"
            resource_type="AV_SURROUNDSOUNDPROCESSOR_FUNCTION">
            <internal logical_component="Main Zone"
              name_on_component="Speakers A"/>
          </resource>
        - <resource type="component" manufacturer="Integra" model="DTR-
            10.5" user_defined_name="IntegraReceiver"
            resource_type="AV_VOLUMECONTROL_FUNCTION">
            <internal logical_component="Main Zone"
              name_on_component="Speakers A"/>
          </resource>
        - <resource type="component" manufacturer="Integra" model="DTR-
            10.5" user_defined_name="IntegraReceiver"
            resource_type="AV_AMPLIFIER_FUNCTION">
          - <output logical_component="Main Zone"
              name_on_component="Speakers A">
              <audio_media type="speakers_7.1_surround"/>
            </output>
          </resource>
        - <resource type="component" manufacturer="" model=""
            user_defined_name="SurrSpeakers"
            resource_type="AV_SURROUNDSOUNDSPEAKERS_SINK">
          - <input logical_component="" name_on_component="">
              <audio_media type="speakers_7.1_surround"/>
            </input>
          </resource>
        </audio>
      - <requests>
        - <request name="SetListeningModeAllChannelStereo"
            from_state="active">
```

```
  - <resource user_defined_name="IntegraReceiver"
     logical_component="Main Zone">
      <action name="SetListeningModeAllChannelStereo"
     resource_type="AV_SURROUNDSOUNDPROCESSOR_FUNCTION"/>
    </resource>
  </request>
- <request name="PowerOn" from_state="inactive" to_state="active">
  - <resource user_defined_name="IntegraDVD"
     logical_component="CD_DVD Player">
      <action name="PowerOn" action_type="universal"/>
    </resource>
  - <resource user_defined_name="IntegraReceiver"
     logical_component="Main Zone">
      <action name="PowerOn" action_type="universal"/>
    </resource>
  - <resource user_defined_name="IntegraReceiver"
     logical_component="Main Zone">
      <action name="SelectDVDInput" action_type="custom"/>
    </resource>
  </request>
- <request name="TrayOpen" from_state="active">
  - <resource user_defined_name="IntegraDVD"
      logical_component="CD_DVD Player">
      <action name="TrayOpen" resource_type="AV_CD_SOURCE"/>
    </resource>
  </request>
- <request name="SetListeningModeEnhanced7" from_state="active">
  - <resource user_defined_name="IntegraReceiver"
      logical_component="Main Zone">
      <action name="SetListeningModeEnhanced7"
     resource_type="AV_SURROUNDSOUNDPROCESSOR_FUNCTION"/>
    </resource>
  </request>
- <request name="SetListeningModeTVLogic" from_state="active">
  - <resource user_defined_name="IntegraReceiver"
      logical_component="Main Zone">
      <action name="SetListeningModeTVLogic"
     resource_type="AV_SURROUNDSOUNDPROCESSOR_FUNCTION"/>
    </resource>
  </request>
- <request name="SetListeningModeneo6THXCinema"
    from_state="active">
  - <resource user_defined_name="IntegraReceiver"
      logical_component="Main Zone">
      <action name="SetListeningModeneo6THXCinema"
     resource_type="AV_SURROUNDSOUNDPROCESSOR_FUNCTION"/>
    </resource>
  </request>
- <request name="SetListeningTheaterListening" from_state="active">
  - <resource user_defined_name="IntegraReceiver"
      logical_component="Main Zone">
      <action name="SetListeningTheaterListening"
     resource_type="AV_SURROUNDSOUNDPROCESSOR_FUNCTION"/>
```

```
    </resource>
  </request>
- <request name="Pause" from_state="active">
  - <resource user_defined_name="IntegraDVD"
      logical_component="CD_DVD Player">
      <action name="CommandPause"
        resource_type="AV_CD_SOURCE"/>
    </resource>
  </request>
- <request name="VolumeDown" from_state="active">
  - <resource user_defined_name="IntegraReceiver"
      logical_component="Main Zone">
      <action name="DecreaseVolume"
        resource_type="AV_VOLUMECONTROL_FUNCTION"/>
    </resource>
  </request>
- <request name="SetListeningModePLIIPLIIXMovie"
    from_state="active">
  - <resource user_defined_name="IntegraReceiver"
      logical_component="Main Zone">
      <action name="SetListeningModePLIIPLIIXMovie"
        resource_type="AV_SURROUNDSOUNDPROCESSOR_FUNCTION"/>
    </resource>
  </request>
- <request name="PowerOff" from_state="active" to_state="inactive">
  - <resource user_defined_name="IntegraReceiver"
      logical_component="Main Zone">
      <action name="PowerOff" action_type="universal"/>
    </resource>
  - <resource user_defined_name="IntegraDVD"
      logical_component="CD_DVD Player">
      <action name="PowerOff" action_type="universal"/>
    </resource>
  </request>
- <request name="ScanDown" from_state="active">
  - <resource user_defined_name="IntegraDVD"
      logical_component="CD_DVD Player">
      <action name="CommandScanDown"
      resource_type="AV_CD_SOURCE"/>
    </resource>
  </request>
- <request name="ToggleRepeat" from_state="active">
  - <resource user_defined_name="IntegraDVD"
      logical_component="CD_DVD Player">
      <action name="ToggleRepeat"
      resource_type="AV_CD_SOURCE"/>
    </resource>
  </request>
- <request name="SetListeningModeDolbyVirtual" from_state="active">
  - <resource user_defined_name="IntegraReceiver"
    logical_component="Main Zone">
      <action name="SetListeningModeDolbyVirtual"
     resource_type="AV_SURROUNDSOUNDPROCESSOR_FUNCTION"/>
```

```
    </resource>
  </request>
- <request name="SetListeningModeNeo6Cinema" from_state="active">
  - <resource user_defined_name="IntegraReceiver"
      logical_component="Main Zone">
      <action name="SetListeningModeNeo6Cinema"
        resource_type="AV_SURROUNDSOUNDPROCESSOR_FUNCTION"/>
    </resource>
  </request>
- <request name="ScanUp" from_state="active">
  - <resource user_defined_name="IntegraDVD"
      logical_component="CD_DVD Player">
      <action name="CommandScanUp"
        resource_type="AV_CD_SOURCE"/>
    </resource>
  </request>
- <request name="SkipUp" from_state="active">
  - <resource user_defined_name="IntegraDVD"
      logical_component="CD_DVD Player">
      <action name="CommandSkipUp"
        resource_type="AV_CD_SOURCE"/>
    </resource>
  </request>
- <request name="SetListeningModeMusicMode" from_state="active">
  - <resource user_defined_name="IntegraReceiver"
      logical_component="Main Zone">
      <action name="SetListeningModeMusicMode"
        resource_type="AV_SURROUNDSOUNDPROCESSOR_FUNCTION"/>
    </resource>
  </request>
- <request name="IncrementListeningMode" from_state="active">
  - <resource user_defined_name="IntegraReceiver"
      logical_component="Main Zone">
      <action name="IncrementListeningMode"
        resource_type="AV_SURROUNDSOUNDPROCESSOR_FUNCTION"/>
    </resource>
  </request>
- <request name="SetListeningMode5.1ChannelSurround"
    from_state="active">
  - <resource user_defined_name="IntegraReceiver"
      logical_component="Main Zone">
      <action name="SetListeningMode5.1ChannelSurround"
        resource_type="AV_SURROUNDSOUNDPROCESSOR_FUNCTION"/>
    </resource>
  </request>
- <request name="SetListeningModeTHXSurroundEX"
    from_state="active">
  - <resource user_defined_name="IntegraReceiver"
      logical_component="Main Zone">
      <action name="SetListeningModeTHXSurroundEX"
        resource_type="AV_SURROUNDSOUNDPROCESSOR_FUNCTION"/>
    </resource>
  </request>
```

```xml
- <request name="SetListeningModeAction" from_state="active">
  - <resource user_defined_name="IntegraReceiver"
      logical_component="Main Zone">
      <action name="SetListeningModeAction"
        resource_type="AV_SURROUNDSOUNDPROCESSOR_FUNCTION"/>
    </resource>
  </request>
- <request name="SetListeningModeOrchestra" from_state="active">
  - <resource user_defined_name="IntegraReceiver"
      logical_component="Main Zone">
      <action name="SetListeningModeOrchestra"
        resource_type="AV_SURROUNDSOUNDPROCESSOR_FUNCTION"/>
    </resource>
  </request>
- <request name="ToggleRandom" from_state="active">
  - <resource user_defined_name="IntegraDVD"                              902
      logical_component="CD_DVD Player">
      <action name="ToggleRandom"
        resource_type="AV_CD_SOURCE"/>
    </resource>
  </request>
- <request name="SetListeningModeMonoMovie" from_state="active">
  - <resource user_defined_name="IntegraReceiver"
      logical_component="Main Zone">
      <action name="SetListeningModeMonoMovie"
        resource_type="AV_SURROUNDSOUNDPROCESSOR_FUNCTION"/>
    </resource>
  </request>
- <request name="TrayClose" from_state="active">
  - <resource user_defined_name="IntegraDVD"
      logical_component="CD_DVD Player">
      <action name="TrayClose" resource_type="AV_CD_SOURCE"/>
    </resource>
  </request>
- <request name="SetListeningModeMusical" from_state="active">
  - <resource user_defined_name="IntegraReceiver"
      logical_component="Main Zone">
      <action name="SetListeningModeMusical"
        resource_type="AV_SURROUNDSOUNDPROCESSOR_FUNCTION"/>
    </resource>
  </request>
- <request name="SetListeningModeMultiplex" from_state="active">
  - <resource user_defined_name="IntegraReceiver"
      logical_component="Main Zone">
      <action name="SetListeningModeMultiplex"
        resource_type="AV_SURROUNDSOUNDPROCESSOR_FUNCTION"/>
    </resource>
  </request>
- <request name="SetListeningModeNeo6Music" from_state="active">
  - <resource user_defined_name="IntegraReceiver"
      logical_component="Main Zone">
      <action name="SetListeningModeNeo6Music"
        resource_type="AV_SURROUNDSOUNDPROCESSOR_FUNCTION"/>
```

FIG. 9E

</resource>
</request>
- <request name="SetListeningModeU2Cinema" from_state="active">
- <resource user_defined_name="IntegraReceiver"
logical_component="Main Zone">
<action name="SetListeningModeU2Cinema"
resource_type="AV_SURROUNDSOUNDPROCESSOR_FUNCTION"/>
</resource>
</request>
- <request name="SetListeningModeMono" from_state="active">
- <resource user_defined_name="IntegraReceiver"
logical_component="Main Zone">
<action name="SetListeningModeMono"
resource_type="AV_SURROUNDSOUNDPROCESSOR_FUNCTION"/>
</resource>
</request>
- <request name="SetListeningModeUnplugged" from_state="active">
- <resource user_defined_name="IntegraReceiver"
logical_component="Main Zone">
<action name="SetListeningModeUnplugged"
resource_type="AV_SURROUNDSOUNDPROCESSOR_FUNCTION"/>
</resource>
</request>
- <request name="SetListeningModeTHXCinema" from_state="active">
- <resource user_defined_name="IntegraReceiver"
logical_component="Main Zone">
<action name="SetListeningModeTHXCinema"
resource_type="AV_SURROUNDSOUNDPROCESSOR_FUNCTION"/>
</resource>
</request>
- <request name="SetListeningModeGamesMode" from_state="active">
- <resource user_defined_name="IntegraReceiver"
logical_component="Main Zone">
<action name="SetListeningModeGamesMode"
resource_type="AV_SURROUNDSOUNDPROCESSOR_FUNCTION"/>
</resource>
</request>
- <request name="SetListeningModePureAudio" from_state="active">
- <resource user_defined_name="IntegraReceiver"
logical_component="Main Zone">
<action name="SetListeningModePureAudio"
resource_type="AV_SURROUNDSOUNDPROCESSOR_FUNCTION"/>
</resource>
</request>
- <request name="SetListeningModeStudioMix" from_state="active">
- <resource user_defined_name="IntegraReceiver"
logical_component="Main Zone">
<action name="SetListeningModeStudioMix"
resource_type="AV_SURROUNDSOUNDPROCESSOR_FUNCTION"/>
</resource>
</request>
- <request name="MuteOn" from_state="active">
- <resource user_defined_name="IntegraReceiver"

```
logical_component="Main Zone">
        <action name="MuteOn"
         resource_type="AV_VOLUMECONTROL_FUNCTION"/>
      </resource>
   </request>
 - <request name="DecrementListeningMode" from_state="active">
   - <resource user_defined_name="IntegraReceiver"
        logical_component="Main Zone">
        <action name="DecrementListeningMode"
         resource_type="AV_SURROUNDSOUNDPROCESSOR_FUNCTION"/>
      </resource>
   </request>
 - <request name="SetListeningModeDolbyEX" from_state="active">
   - <resource user_defined_name="IntegraReceiver"
        logical_component="Main Zone">
        <action name="SetListeningModeDolbyEX"
         resource_type="AV_SURROUNDSOUNDPROCESSOR_FUNCTION"/>
      </resource>
   </request>
 - <request name="SetListeningModeTTHX" from_state="active">          902
   - <resource user_defined_name="IntegraReceiver"
        logical_component="Main Zone">
        <action name="SetListeningModeTTHX"
         resource_type="AV_SURROUNDSOUNDPROCESSOR_FUNCTION"/>
      </resource>
   </request>
 - <request name="SetListeningModePLIIPLIXMusic"
     from_state="active">
   - <resource user_defined_name="IntegraReceiver"
        logical_component="Main Zone">
        <action name="SetListeningModePLIIPLIXMusic"
         resource_type="AV_SURROUNDSOUNDPROCESSOR_FUNCTION"/>
      </resource>
   </request>
 - <request name="MuteOff" from_state="active">
   - <resource user_defined_name="IntegraReceiver"
        logical_component="Main Zone">
        <action name="MuteOff"
         resource_type="AV_VOLUMECONTROL_FUNCTION"/>
      </resource>
   </request>
 - <request name="SetVolume" from_state="active">
      <arg name="VolumeValue"/>
   - <resource user_defined_name="IntegraReceiver"
        logical_component="Main Zone">
      - <action name="SetVolume"
          resource_type="AV_VOLUMECONTROL_FUNCTION">
          <arg name="VolumeValue"/>
        </action>
      </resource>
   </request>
 - <request name="VolumeUp" from_state="active">
   - <resource user_defined_name="IntegraReceiver"
```

FIG. 9G

```
logical_component="Main Zone">
      <action name="IncreaseVolume"
       resource_type="AV_VOLUMECONTROL_FUNCTION"/>
    </resource>
  </request>
- <request name="SetListeningModeFullMono" from_state="active">
  - <resource user_defined_name="IntegraReceiver"
      logical_component="Main Zone">
      <action name="SetListeningModeFullMono"
       resource_type="AV_SURROUNDSOUNDPROCESSOR_FUNCTION"/>
    </resource>
  </request>
- <request name="Play" from_state="active">
  - <resource user_defined_name="IntegraDVD"
     logical_component="CD_DVD Player">
      <action name="CommandPlay"
       resource_type="AV_CD_SOURCE"/>
    </resource>
  </request>
- <request name="SkipDown" from_state="active">
  - <resource user_defined_name="IntegraDVD"
      logical_component="CD_DVD Player">
      <action name="CommandSkipDown"
       resource_type="AV_CD_SOURCE"/>
    </resource>
  </request>
- <request name="Stop" from_state="active">
  - <resource user_defined_name="IntegraDVD"
      logical_component="CD_DVD Player">
      <action name="CommandStop"
       resource_type="AV_CD_SOURCE"/>
    </resource>
  </request>
- <request name="SetListeningModePLIIPLIIXGame"
   from_state="active">
  - <resource user_defined_name="IntegraReceiver"
      logical_component="Main Zone">
      <action name="SetListeningModePLIIPLIIXGame"
       resource_type="AV_SURROUNDSOUNDPROCESSOR_FUNCTION"/>
    </resource>
  </request>
- <request name="SetListeningModePLIIPLIIXTHXCinema"
   from_state="active">
  - <resource user_defined_name="IntegraReceiver"
      logical_component="Main Zone">
      <action name="SetListeningModePLIIPLIIXTHXCinema"
       resource_type="AV_SURROUNDSOUNDPROCESSOR_FUNCTION"/>
    </resource>
  </request>
 </requests>
</service>
```

PROGRAMMABLE MULTIMEDIA CONTROLLER WITH PROGRAMMABLE SERVICES

RELATED APPLICATION

This application is related to the copending application entitled "System and Method for a Programmable Multimedia Controller," filed Dec. 20, 2005, assigned to a common assignee and identified by U.S. application Ser. No. 11/314,664, which is hereby incorporated by reference in its entirety.

BACKGROUND OF THE INVENTION

1. Field of the Invention

The present invention relates generally to the fields of multimedia and communications and, more specifically, to a programmable multimedia controller for home, commercial, professional audio or video, broadcast or film studio, security, automation or other use which is capable of interfacing with, controlling and managing a wide variety of audio, video, telecommunications, data communications and other devices.

2. Background Information

Commercial offerings of consumer electronic devices have expanded dramatically in response to the falling cost of electronic hardware and introduction of new media. For example, within only a few years, compact disk (CD) technology largely displaced vinyl records and magnetic tapes as the music recording medium of choice, but was in turn displaced by MP3 technology. Similarly, digital versatile disk (DVD) technology largely displaced videotape as the video recording medium of choice, while digital cameras have effectively replaced film cameras. The advent of new technologies and media, and the corresponding consumer demand for products based on the latest advances, drives manufacturers to rapidly introduce new products. As a result, an overwhelming number of product types and models permeate the market.

One long-standing problem which persists for many consumers is the complexity involved with interconnecting various electronic devices which are typically sold individually and not as parts of an integrated system. For example, a consumer may acquire an audio receiver, cable TV box, television, DVD player and surround sound system made by different manufacturers. The basic problem of interconnecting a group of components by a series of cables is challenging for many users, let alone sufficiently understanding the various modes of operations and features which, if properly used, will allow the components to work best together and produce the most enjoyable entertainment experiences.

Another long-standing problem with most, if not all, previous approaches to integrating disparate components is that some type of central controller is used which operates on software written in a high-level computer language. The use of a high-level computer language presents several difficulties. First, it is all but certain that the manufacturer will not make the source code available to the user, thus effectively preventing a user who wished to customize a system from doing so. Second, even if the source code is made available, the overwhelming majority of users do not have the technical expertise, time or inclination to write or modify source code. Third, the introduction of new devices by manufacturers almost certainly necessitate that the source code be modified in order to make the central controller compatible with such devices.

Yet another long-standing problem is an absence of any widely adopted industry standard regarding control interfaces for consumer electronics devices. Manufacturers have incorporated varying communication protocols, most of which are proprietary in nature, do not conform to any standard, and are implemented with extremely detailed source code. This absence of standards greatly complicates the problem of how to integrate and centrally control a wide variety of consumer electronics devices such that they work together and are manageable by an average user who does not possess substantial technical expertise.

SUMMARY OF THE INVENTION

In brief summary, the present invention provides a programmable multimedia controller with programmable services. The multimedia controller is based on a general purpose computer which controls a specialized embedded computer system. The general purpose computer may be matched with a second general purpose computer to provide redundancy. The multimedia controller is capable of interfacing with, controlling or managing a wide variety of audio, video, telecommunications, data communications or other devices.

The multimedia controller includes a programming environment for creating services or user experiences that may incorporate features or functionalities of several devices that are conventionally operated as separate, standalone devices. Such services may range in complexity from simple control functions to multimedia experiences that combine high performance audio and video with the graphics capability of a general purpose computer, web-based services and telecommunications.

Services may be implemented according to various zones within a larger physical space. For example, a user may specify that certain services are available in the family room of a home, while different services are available in the kitchen, depending upon the components that are available in each room or user preferences. Services may also be implemented on a per user basis in conjunction with a user profile which specifies preferences, restrictions (e.g., parental controls) and the like.

The programming environment includes a library of component profiles. Component profiles may be implemented in a number of ways based upon desired attributes of the underlying data structures. In a preferred embodiment, a component profile is implemented as an Extensible Markup Language (XML) file which describes certain attributes of a component such as a DVD player, television, amplifier or any other type of component that is capable of interfacing with the system of the present invention. A component profile typically describes at least some of the physical characteristics of the component (e.g., the input/output connectors located on the back of the component), the configuration of the component (e.g., all possible types of modules that may be present in the slots or bays of a modular receiver), the set of commands that the component recognizes (e.g., power on, power off, open disk tray), as well as the functions that the component is capable of performing (e.g., play, pause, stop).

Use of XML files for component profiles, as well as other aspects of the present invention discussed below, provides several advantages including particularly the ease with which component profiles may be created for new components introduced into the market in the future. Further, the use of XML makes the process of customization through editing existing component profiles extremely simple as compared to writing or modifying source code. Accordingly, the present invention includes a programming tool to assist installers or users who wish to create custom component profiles or modify profiles that are available in the library.

The library of component profiles may be stored on a hard disk drive or other storage media that is physically part of the system or otherwise available to the system by way of a network or other communication link. One or more component profiles or even the entire library may be acquired, or updated as necessary, by accessing a designated website over the internet and downloading the appropriate files. Updating of the component profile library may be implemented as an automatic process or as one in which a user initiates or controls the process.

Using the library of component profiles, the present invention allows a user to interactively describe how a particular installation is actually wired through an on-screen tutorial. In the case of a new installation, the present invention may make recommendations to the user as to how to wire an installation. Once wiring is established, the present invention may advise the user on what services are available.

The programming environment also includes zone configurations, which are also preferably implemented as XML files. A zone configuration is essentially a description which includes an identification of what components are present in a particular room or other space, which modules are actually present within a modular component, how those components are interconnected and a specification of what type(s) of controller is available to the user in that space.

The programming environment also includes connection configurations, again preferably implemented as XML files. A connection configuration is essentially a file that stores the installation wiring information referred to above and is used in determining what services can be supported by a particular installation.

The programming environment also includes service rules. A service rule, preferably implemented as an XML file, essentially defines what components are needed to implement a particular service and how a particular component or group of components will interact to provide the service.

Within the programming environment, component profiles, zone configurations, connection configuration and service rules are all provided as inputs to a configuration compiler, which produces a service implementation, also preferably implemented as an XML file. The service implementation is, in turn, supplied as an input to a workflow generator which produces both an executable form of the service implementation as well as a graphical representation of the executable form. The graphical representation advantageously provides a convenient and easy to use format that may be displayed and edited using the general purpose computer. By editing the graphical representation, a user is effectively modifying the corresponding executable form directly. In this fashion, a user with little or no programming expertise is able to create and customize programmable services as desired.

Another aspect of the present invention which also enhances the ease of use and programmability of the system is a user interface which, in a preferred embodiment, is based upon the functionality of a DVD player coupled with widely available DVD authoring software. In this aspect, the present invention leverages two important considerations: a DVD player (i.e., the functionality of a DVD player as embodied in a video decoder chip) is very inexpensive; and users are generally very familiar with how to operate a DVD player to select items from displayed menus. Accordingly, a user interface which is very inexpensive, yet is readily understood by a large majority of users, may be implemented using commercially available DVD authoring software. Such software may be used to create videos which, when played, present information, menus or choices with which the user interacts using a simple remote control, portable DVD player, touchscreen or any of a number of other control devices supported by the present invention. As part of system configuration and setup, one such video may be used to gather necessary information to create one or more user profiles.

Another aspect of the present invention is its expandability. Multiple multimedia controllers may be interconnected to form a larger system in which any input audio or video signal one controller may be switched to any output on the same or different controller. In such an expanded system, different controllers may be programmed to provide different services. For example, one controller may be programmed to provide video-related services while a second interconnected controller may be programmed to provide audio-related services.

The services which the present invention may implement are diverse and vast in number. For example, assume that a user has the system of the present invention interfaced with a DVD player, a television and a telephone line. With those components, a simple service may be defined such that when a user is watching a DVD movie and receives a phone call, the system of the present invention will automatically command the DVD player to pause and cause the caller ID to be displayed in the video frame on the television. As a result, the user may decide whether to answer the call without physically going to the phone or manually controlling the DVD player. If the call is answered, the DVD player will remain paused. If the call is not answered or is answered and then finished, the movie will automatically resume playing after a period time that may be programmed by the user.

Another example of a simple service that the present invention may implement involves the combination of a television and access to the internet. The present invention may be used to access information from the internet, such as stock quotes, sports scores or weather information, and display that information anywhere in a video image on the TV screen or, alternatively, as a “ticker” that moves along the bottom of the image as the user watches a desired TV program.

Yet another example of a service that the present invention may implement involves the combination of a television and a wireless (cell phone). The present invention may be used to detect the arrival of a short message service (SMS) text message by the cell phone and display the text message as an overlay on the image displayed by the television. In this fashion, the user is able to view the text message without handling the cell phone.

BRIEF DESCRIPTION OF THE DRAWINGS

The invention description below refers to the accompanying drawings, of which:

Figure 5M:
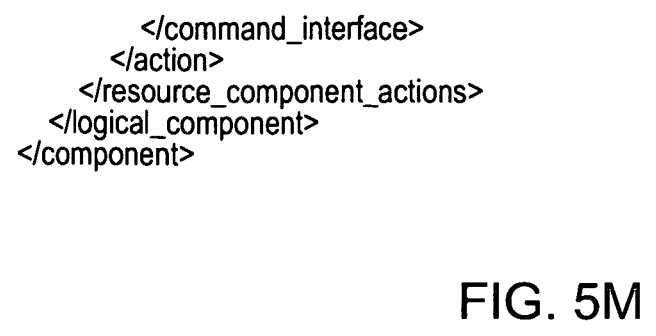

FIGS. 5A-5M show a component profile for a DVD player;

FIG. 6 shows a zone configuration for a receiver;

FIGS. 7A-7C show a connection configuration for a receiver;

FIGS. 8A-8H show a service rule for listening to a radio broadcast;

FIGS. 9A-9H show a service implementation for playing a CD in a DVD player which is connected with a receiver that is also connected to surround sound speakers;

DETAILED DESCRIPTION OF AN ILLUSTRATIVE EMBODIMENT

Figure 1:
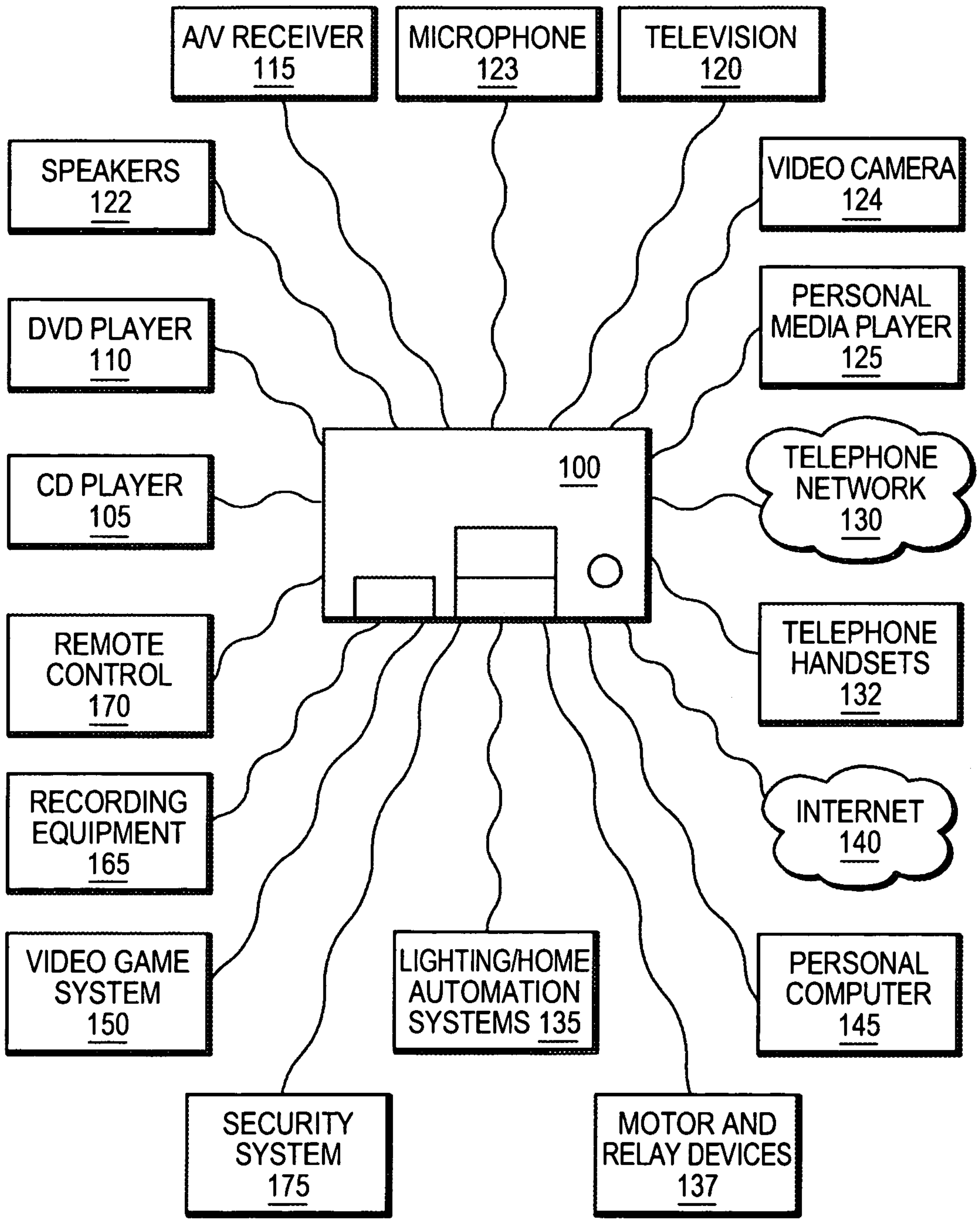
FIG. 1 is a block diagram of a home multimedia controller 100, interconnected to a number of devices, according to an illustrative embodiment of the present invention.

FIG. 1 is a block diagram of a programmable multimedia controller 100, interconnected to a number of devices, according to an illustrative embodiment of the present invention. The term "programmable multimedia controller" should be interpreted broadly as a device capable of controlling, switching data between, and/or interoperating with a variety of electronic devices, such as audio, video, telephony, data, security, motor-driven, relay-driven, and/or other types of electronic devices . . . By interacting with these devices the programmable multimedia controller may implement an integrated multimedia control solution.

In the illustrative embodiment, the programmable multimedia controller 100 is connected to a wide range of audio/video components, for example, a compact disk (CD) player 105, a digital versatile disc (DVD) player 110, an audio/video receiver 115, a television 120, a personal media player 125, speakers 122, a microphone 123, and/or a video camera 124. The programmable multimedia controller may also be connected to telephony devices such as a telephone network 130 and telephone handsets 132. The telephone network 130 may be a publicly switched telephone network (PSTN), an Integrated Services Digital Network (ISDN) or other communications network.

In addition, the programmable multimedia controller may intercommunicate with variety of light and/or home automation systems 135. These devices may operate via the X10 protocol developed by Pico Electronics, the INSTEON™ protocol developed by SmartHome, Inc, the CEBus standard managed by the CEBus Industry Council, or another well known home automation or control protocol. Similarly the controller may be connected to motor and/or relay operated devices 137 that may include, for example, a heating, ventilation and air conditioning system (HVAC) system, an irrigation system, an automatic shade or blind system, an electronic door lock, or other types of devices.

A computer network, such as the Internet 140, is connected to the multimedia controller. In addition, a personal computer (PC) 145, video game systems 150, home recording equipment 165 or other devices may also be connected. Further, one or more remote control units 170 may be provided to manage the controller's functionality, and/or to control devices connected to the controller. Such remote control units may be interconnected to the controller via a wired network connection, an infra-red link, a radio-frequency link, a Bluetooth™ link, a ZigBee™ link or another appropriate data connection.

In addition to providing interconnection to a wide variety of devices, the programmable multimedia controller is able to combine, synthesize, and otherwise processes various data types to implement an integrated multimedia solution for a user.

To facilitate the above described interconnections and processing, the programmable multimedia controller 100 may be arranged in a modular manner. For example, in one embodiment, the programmable multimedia controller 100 is arranged to have twelve separate input and output modules, each having a number of connection ports. The input and output modules are inserted into slots or module bays of the programmable multimedia controller 100. The modules interface with a mid-plane that provides connection to the rest of the system. By embracing a modular approach, a user is allowed to select the specific modules desired, and the system may be customized to fit a particular application. In addition, entry level pricing may be reduced by allowing a user to purchase a base configuration, with limited capabilities, and then add to the system by purchasing addition modules. Several examples of modules are discussed below, in reference to FIGS. 4-10, 12 and 13. It is expressly contemplated that a wide variety of additional modules may be provided, and, accordingly, this disclosure should be interpreted to embrace such other possible configurations. It is also contemplated that several programmable multimedia controllers may be interconnected to create a larger system, in effect implementing a modular-type solution at the controller level. Further details regarding such interconnection and expansion may be found below in reference to FIGS. 18 and 19.

Figure 2:
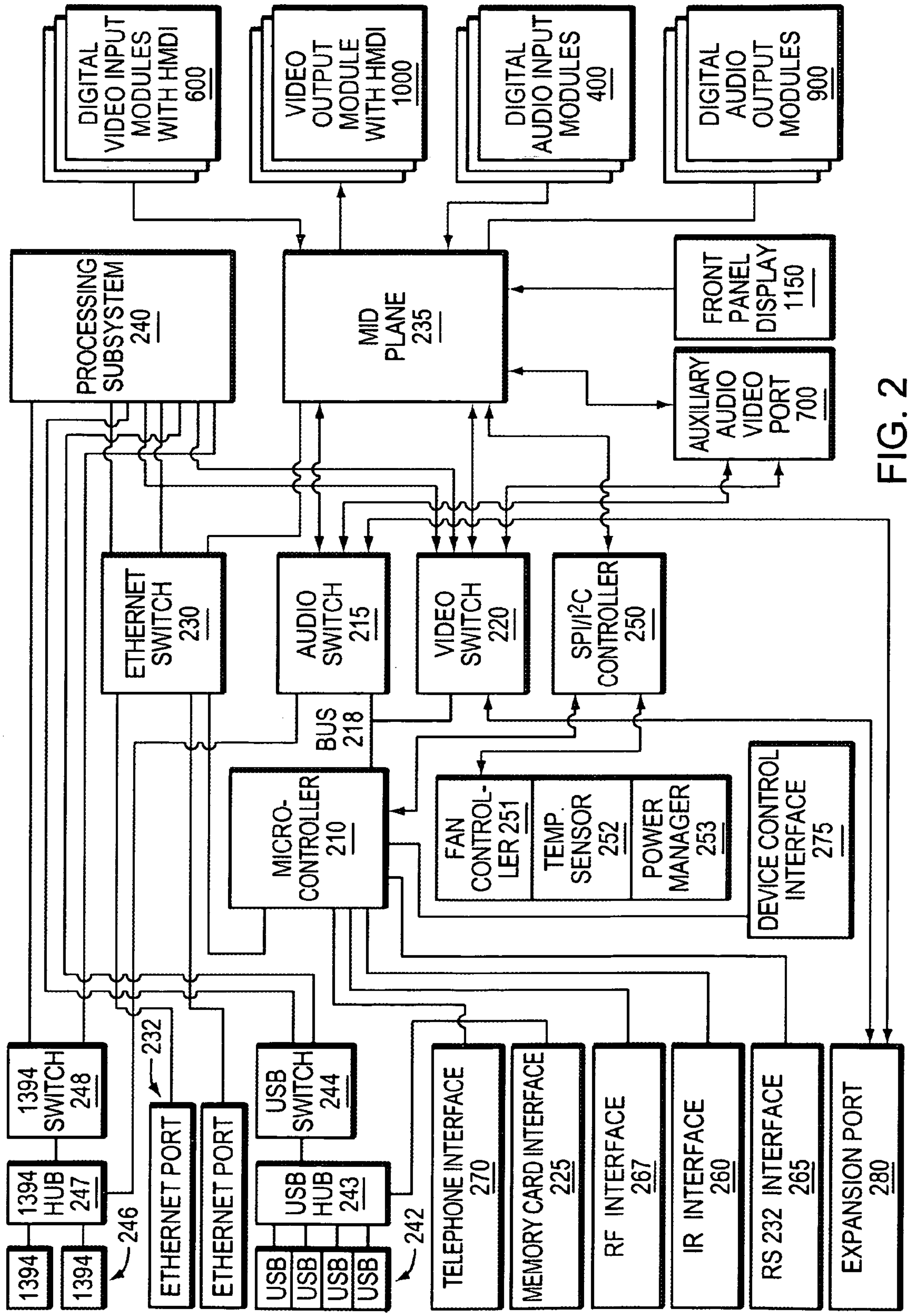
FIG. 2 is a schematic block diagram showing the high-level hardware architecture of the system of FIG. 1.

FIG. 2 is a schematic block diagram showing a high-level hardware architecture of the programmable multimedia controller. The various components shown may be arranged on a "motherboard" of the controller, or on a plurality of cards interconnected by a backplane (not shown). A microcontroller 210 manages the general operation of the system. In the illustrative embodiment, the microcontroller is a 32-bit model MCF5234 microcontroller available from Freescale Semiconductor Inc. The microcontroller 210 is coupled to an audio switch 215 and a video switch 220 via a bus 218. The audio switch 215 and the video switch 220 are preferably crosspoint switches capable of switching a number of connections simultaneously. However many other types of switches capable of switching digital signals could be employed, for example Time Division Multiplexing (TDM) switches. Further discussion of these switches may be found below in reference to FIG. 3 and FIG. 11.

A mid plane 235 interconnects the switches and other devices to a variety of input and output modules such as, for example, Digital Video Input Modules with HDMI 600, Video Output Modules with HDMI 1000, Digital Audio Input Modules 400, and Digital Audio Output Modules 900. The mid plane 235 is further coupled to an Ethernet switch 230 that permits switching of 10BaseT, 100BaseT or Gigabyte Ethernet signals. The Ethernet switch 230 interconnects Ethernet ports 232 and a processing subsystem 240 to the microcontroller 210. In one embodiment, the processing subsystem 240 includes a plurality of small form factor general purpose personal computers that provide redundant operation and/or load balancing. In some embodiments, the processing subsystem 240 may include one or more storage devices, external to the personal computers, to provide expanded storage capacity, for example, to store digital media. Further discussion of the various embodiments of the data processing subsystem 240 may be found below in reference to FIGS. 14-16.

Also, a number of Universal Serial Bus (USB) ports 242 are interconnected to a USB hub 243 for interconnection to the processing subsystem 240. A memory card interface 225 may also be connected to the USB hub 243. The interface accepts one or more well known memory card formats, for example CompactFlash™ cards, Memory Stick™ cards, Secure Digital™ (SD) cards, or other formats. A USB switch 244 is employed to switch USB links among the multiple processing components that may be present. In a similar manner, a number of IEEE 1394 (FireWire™) ports 246 are interconnected to an IEEE 1394 hub 247 and to an IEEE 1394 switch 248.

The microcontroller 210 is further connected to a Serial Peripheral Interface (SPI) and Inter-Integrated Circuit ($I^2C$) distribution circuit 250, which provides a serial communication interface to relatively low data transfer rate devices. The SPI/$I^2C$ controller 250 is connected to the mid-plane connector 235 and thereby provides control commands from the microcontroller 210 to the modules and other devices in the programmable multimedia controller 100. Further connections from SPI/$I^2C$ controller 250 are provided to devices such as a fan controller 251, a temperature sensor 252 and a power manager circuit 253, which manage the thermal characteristics of the system and prevent overheating.

The microcontroller 210 is also connected to Infra-Red (IR) interface 260, an RS232 interface 265, and an RF interface 267, that permit interconnection with external devices. Such interaction permits programmable multimedia controller 100 to control external devices. In addition the interfaces may receive control signals that control the operation of the programmable multimedia controller itself. It is expressly contemplated that various other interfaces, including WI-FI, Bluetooth™, ZigBee™ and other wired and wireless interfaces, may be used with the multimedia controller 100. Further discussion of such interfaces may be found below in reference to FIG. 17.

In addition, an Auxiliary Audio/Video Port 700 is provided for interconnecting one or more video game systems, camcorders, computers, karaoke machines or other devices. A telephone interface 270 is provided for connecting to the public switch telephone network or to a private network, and to telephone handsets. Further, a device control interface 275 is provided to communicate with lighting, home automation, and motor and/or relay operated devices. As discussed in more detail below, an expansion port 280 is provided for linking several programmable multimedia controllers together to form an expanded system. Finally, a front panel display 1150 permits presentation of status, configuration, and/or other information to a user. In one embodiment the from panel can display video data originating from any input source connected to the system, such that one may preview video content on the display. In another embodiment the front panel display 1150 includes a touch sensitive screen, and a user may enter control selections by selecting icons on the screen.

Figure 3:
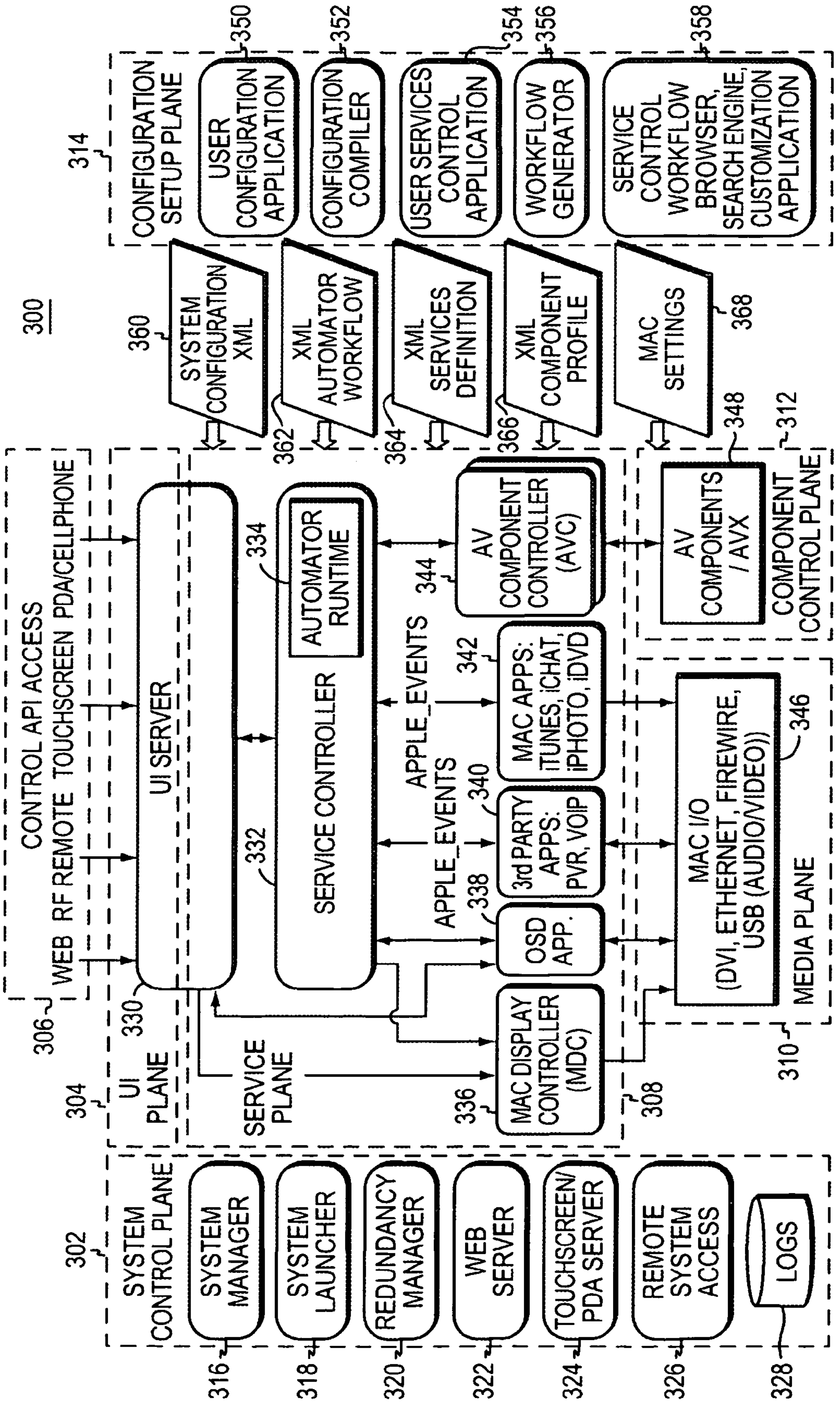
FIG. 3 is a schematic block diagram showing the high-level software architecture of the system of FIG. 1.

FIG. 3 is a block diagram of the high-level software architecture of the controller 100. The software architecture is organized as a series of planes including a system control plane 302, a user interface (UI) plane 304, a control application programming interface (API) access 306, a service plane 308, a media plane 310, a component control plane 312 and a configuration/setup plane 314.

System control plane 302 includes the functionalities of a system manager 316, a system launcher 318, a redundancy manager 320, a web server 322, a touchscreen/PDA server 324, a remote system access manager 326 and system logs 328. UI plane 304 shares a UI server 330 with service plane 308. Service plane 308 includes the functionalities of a service controller 332 which itself includes an automator runtime 334. Service plane 308 also includes the functionalities of a Mac display controller 336, an on-screen display (OSD) application 338, third party applications 340, Mac applications 342 and an audio/video component controller 344. Through automator runtime 334, service controller 332 is capable of controlling Mac applications including iTunes, iChat, iPhoto and iDVD that support Applescript, which enables application-to-application control. Similarly, through automator runtime 334, service controller 332 is capable of controlling other third party applications which support AppleScript.

Media plane 310 includes the functionality of Mac input/output (I/O) in all supported formats (i.e., DVI, Ethernet, FireWire™, USB, etc.). Component control plane 312 includes the functionality of controlling audio/video components 348.

Configuration/setup plane 314 includes the functionalities of a user configuration application 350, a configuration compiler 352, a user services control application 354, a workflow generator 356 and a service control workflow browser/search engine/customization application 358. Configuration/setup plane 314 also passes several types of information to UI plane 304 and service plane 308 including system configuration 360, automator workflow 362, services definitions 364, component profiles 366 and Mac settings 368. As described in detail below in connection with FIGS. 5-11, in a preferred embodiment, XML files are used to represent system configuration 360, automator workflow 362, services definitions 364 and component profiles 366.

The overall functional responsibilities of the various planes shown in FIG. 3 will now be discussed. In general, system control plane 302 has responsibility for high level system tasks and processes. Redundancy manager 320 has overall responsibility for redundancy arrangements which may be advantageously used in multimedia controller 100. For example, processing subsystem 240 may be implemented using two Mac Mini™ computers as noted above. The use of two computers provides both load-sharing capability as well as one level of redundancy in the even that one of the computers fails.

In order for the two computers to work properly when both are operating properly as well as when one of them fails, data stored on the hard drives normally accessed by only one of the computers must be synchronized. This is preferably done using rsync, a capability which is part of the OS X operating system. In addition, one of the computers will be designated as the “primary” computer based on an arbitration that takes place upon power up of the multimedia controller 100. The “secondary” computer operates in a subordinate role to the primary computer.

One embodiment of an arbitration begins with each computer advertising its presence using the Bonjour Name Service. When one computer discovers another computer, it will connect to the other computer. If both computers are candidates to become primary, then the one with the higher media access control Ethernet address will become primary. Each computer will keep open a connection and “ping” one another. If the primary computer fails to respond to pings, then the secondary computer will assume the role of primary computer.

The primary computer is responsible for allocating streaming resources between itself and the “secondary” computer. Insertable/removable media (e.g. FireWire or USB drives, cameras, ipods) are connected to the primary computer. Data collected by the primary computer from such devices may be passed to the secondary computer by shared mountpoints or another technique.

Control API access 306 has responsibility for an API through which multimedia controller 100 may be controlled by a user who may choose to use a web-enabled device, an RF remote control type device, a touchscreen, a PDA or cell phone. UI plane 304 has functional responsibility for a user interface to multimedia controller 100. Service plane 308 has functional responsibility for implementing services as described above. Automator runtime 334 is responsible for receiving requests or commands from users and mapping them to a workflow for a particular service.

Media plane 310 has functional responsibility for Mac I/O as well as the other internal and external communications interfaces supported by multimedia controller 100. Component control plane 312 has functional responsibility for controlling the operations of audio or video components which may be interfaced with multimedia controller 100. Configuration/setup plane 314 has functional responsibility for enabling users to configure multimedia controller 100; to select, create or modify services; and to select, create or modify component profiles.

Figure 4:
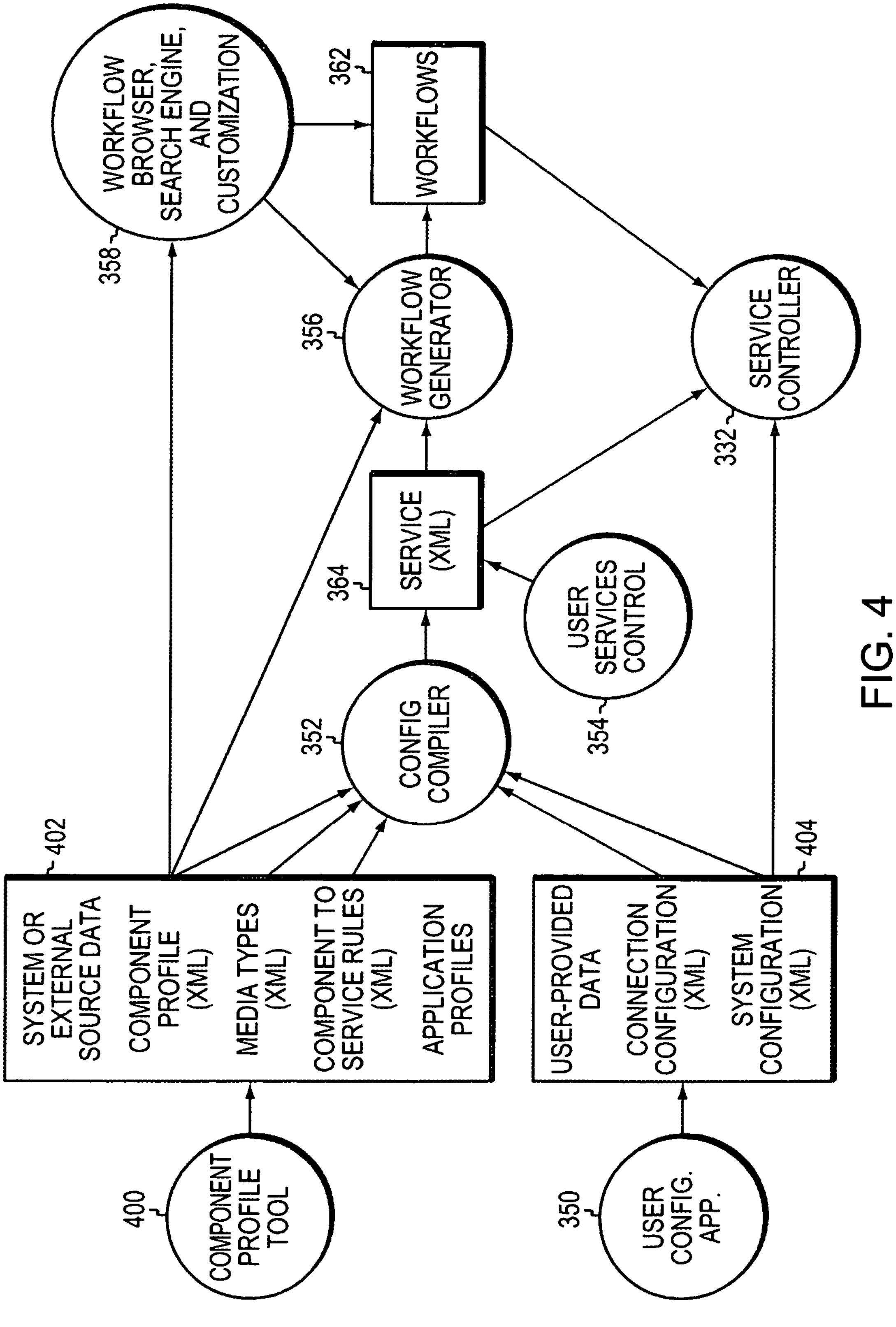
FIG. 4 is block diagram showing the major software components involved in creating services which may be performed by the system of FIG. 1.

With reference now to FIG. 4, the logical relationships among certain functional units depicted in FIG. 3 are shown in greater detail. A collection of data which is stored internally to the system of multimedia controller 100 or obtained from an external source (e.g., a designated website having a library of component profiles) is denoted by reference number 402. Data collection 402 includes component profiles, media types and service rules, preferably in the form of XML files, as discussed above. A second collection of data is provided by the user and is denoted by reference number 404. Data collection 404 includes connection configuration and system configuration information, again preferably in the form of XML files.

A user interacting with user configuration application 350, which is preferably implemented in the form of an on-screen interactive tutorial, will generate the data contained in data collection 404. The tutorial may be displayed on front panel display 1150 (FIG. 1) or on a television or other display which connected to multimedia controller 100. In addition, by using a microphone and speakers connected to the multimedia controller 100 and utilizing the speech recognition/synthesis capabilities which are part of the Mac OS X operating system, the on-screen tutorial may be enhanced for visually-impaired users. In this fashion, instead of on-screen prompts, speech synthesized questions may be asked of the user who simply speaks the answers.

Alternatively, user configuration application 350 may be implemented in the form of an "offline" program that may be run on Mac computer or other device that is not necessarily connected to multimedia controller 100. This implementation would be advantageous for professional installers who wish to prepare a configuration in advance of physical installation of the controller.

User configuration application 350 may be used to create user profiles discussed above. User profiles enable each user to personalize his or her system settings, styles, colors and the like for the on-screen display that multimedia controller 100 will present to that user. User profiles may also include service restrictions. For example, a user profile for a child may contain information which blocks access to adult videos or cable channels. A user profile may be implemented in the form of an XML file or other data file or structure which is compatible with other aspects of the system which require access to it.

A user interacting with a component profile tool 400 will effectively select component profiles from those available in the library of multimedia controller 100, direct the controller to download a needed profile from a designated website or other source, or possibly modify an existing profile or create an entirely new profile as desired. Component profile tool 400 may also include functionality for "learning" the IR or RF commands transmitted by a conventional remote control. Thus, a user who is creating a new component profile for a component that has a remote control may rapidly teach the remote control's command set to component profile tool 400.

Component profile tool 400 may also work in conjunction with an optical wand (not shown) by which a user may scan a manufacturer's bar codes located on a component chassis or possibly the component's packaging. Once a bar code is scanned, component profile tool 400 attempts to find a match in the component profile library or seek the appropriate profile of a designated website or other source.

Data collection 402 may also include application profiles, also preferably implemented as XML files, for controlling third party applications (e.g., iTunes, iChat) as part of a service. In a preferred embodiment, an application profile may be implemented as essentially a list of actions that are executed by running an Applescript. However, application profiles, like the other constructs described herein, may be implemented in a variety of other ways.

Data collections 402 and 404 are supplied as inputs to configuration compiler 352 which, in response, generates a service implementation. The service implementation is, in turn, supplied as an input to services definition 364. User services control application 354 enables a user to review implemented services and to modify or remove them. Services definition 364 provides service definitions to service controller 332 and to workflow generator 356. Service definitions include specifications of what zones, services and components are in the system configuration. Service controller 332 responds to the service definitions by creating internal states and objects to manage the zones, services and components. Service controller 332 also uses the service definitions to help identify what automator workflows sets will exist.

Using information contained in the services definitions, workflow generator 356 generates an initial "default" workflow set in both an executable form and a graphical representation. Each zone and service in the service definitions has a workflow implemented for each request that the service implements. The executable form of the workflow is executed by service controller 332 (FIG. 3).

Workflow browser/search engine/customization application 358 may be used to display, inspect and modify the graphical representations of workflows. When a user edits a graphical representation, the corresponding executable form is automatically changed in accordance with the user's edits. Consequently, a user is able to easily work with and customize workflows in a graphical programming environment, while avoiding the complex logic and minutia of the underlying executables. In addition, speech recognition/synthesis capabilities which are part of the Mac OS X operating system may be utilized in conjunction with, or as an alternative to, the workflow browser/search engine/customization application 358. Thus, as an aid to the visually impaired, FIGS. 5A-5M show an example of a component profile, implemented in a preferred embodiment as an XML file. It will be understood by those skilled in the art that the component profiles, as well as any of the other constructs described herein, may be implemented in a variety of ways using well known techniques, languages and data structures including databases accessible through standard query languages, closed binary representations, text files, spreadsheets HTML files or other file-based data storage methods. More specifically, FIGS. 5A-5M show a component profile for an Integra model DPS-5.5 DVD player. The section denoted by reference number 500 specifies that the DVD player has an RS232 serial communications port which may be used to control the player. Section 502 specifies that the DVD player has digital audio outputs available at a coaxial connector as well as an optical connector. Section 504 specifies that the DVD player has component video output available at both a BNC connector as well as a coaxial connector, and that composite and S-video (left and right) outputs are available.

Section 506 specifies several possible status conditions that the DVD player may report: standby, playback, pause, stop and unknown. Similarly, section 508 specifies several media types that the DVD player may report has been loaded into the player: DVD, VCD, CD, data or unknown. Any of these possible reports may be mapped into a given service and used as a triggering event for some action by multimedia controller 100. For example, a report that a DVD has been loaded into the player could cause the controller 100 to turn the power on to the television (or other specified display) as well as the surround sound system in anticipation of a user wanting to view the DVD. Section 510 specifies the input/output labels that are physically present on the DVD player's chassis.

Section 512 specifies the command which, when sent to the DVD player's RS232 port, will turn the power on. Conversely, section 514 specifies the command which turns the power off. Section 516 specifies the command to play. The remaining sections of FIGS. 5C-5M specify other RS232 commands to which this particular DVD player will respond.

FIG. 6 shows a zone configuration, implemented as an XML file, for a zone named "Lab" that uses an Integra model DTR-10.5 receiver as the zone master The zone also contains an NEC px-42xr3a plasma screen monitor, a Motorola 62000 cable receiver, an Integra DPS-5.5 DVD/CD player and Bay Audio surround sound speakers, all as specified by section 606. Section 600 specifies the physical input/output modules (and the slots that each occupies) that are installed in the receiver. Section 602 describes the format of an input defined by the receiver called "DVD." Because this particular Integra receiver has assignable inputs, a user may give the input a simple name. Thus, sections 602 and 604 are needed to inform the configuration function of the present invention how the user has actually assigned the inputs on the receiver.

The configuration shows that the receiver has assigned an assignable input name "DVD" to correspond to inputs named "Stereo IN 1" for audio and "Component IN 2" for video. Section 604 specifies the format of an input defined by the receiver called "Video 1." The configuration shows that the user has assigned the "Video 1" input to be mapped to inputs named "Stereo IN 2" for audio and "Component IN 2" for video.

FIGS. 7A-7C show an example of a connection configuration for an Integra model DTR-10.5 receiver. Section 700 specifies that an analog audio output (RCA connector) from an Integra DVD player is connected to stereo input 1 (RCA connector) on the Integra receiver. Section 702 specifies that an audio output (RCA connector) from a Motorola cable TV box is connected to stereo input 2 (RCA connector) on the Integra receiver. Section 704 specifies that a component video output (coaxial connector) from the Integra DVD player is connected to component video input 1 (coaxial connector) on the Integra receiver. Section 706 specifies that a video output (coaxial connector) on the Motorola cable TV box is connected to component video input 2 (coaxial connector) on the Integra receiver.

Section 708 specifies that a component video output (coaxial connector) on the Integra receive is connected to a component video input (coaxial connector) on an NEC plasma TV. Section 710 specifies that a set of surround sound 7.1 speakers are connected to the "Speakers A" terminals on the Integra receiver. Section 712 specifies that the Integra receiver has an RS232 port through which it may be controlled. Similarly, section 714 specifies that the NEC plasma TV has an RS232 port through which it may be controlled.

FIGS. 8A-8H shows a service rule for listening to a radio broadcast which may be processed by a digital signal processor for desired decoding or effects. Section 800 specifies the resources that are needed to implement this service: a radio source; an audio switch function (to switch the input audio signal to the output device (speakers)); a surround sound processor function and surround sound speakers; or a radio source; an audio switch function; a volume control function; an amplifier function; and stereo speakers.

Section 802 specifies two universal requests, namely, power on and power off. Section 804 specifies volume control requests including mute on and mute off. Section 806 specifies a series of requests relating to surround sound processing options. Section 808 specifies request relating to radio control including frequency selection, preset selection, display and scan.

FIGS. 9A-9H show a service implementation for playing a CD in a DVD player is where the DVD player is connected to a receiver that is capable of surround sound processing. Section 900 specifies the following (audio) components that are needed to implement the service: an Integra model DPS-5.5 DVD player; and Integra model DTR-10.5 receiver (which includes surround sound processing capability); and a set of surround sound speakers. Section 902 specifies all user requests or commands that the DVD player and receiver will recognize.

Figure 10:
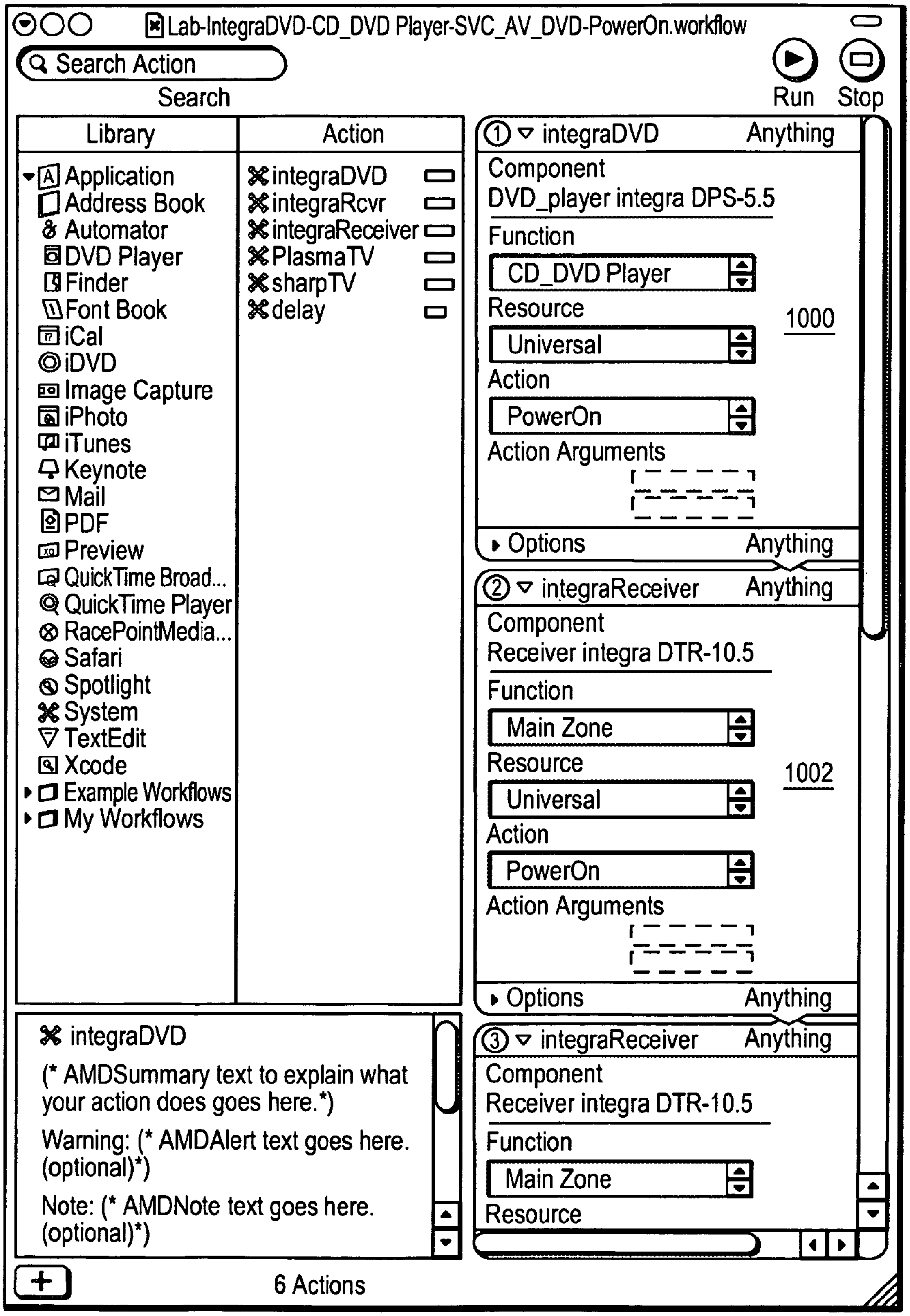
FIG. 10 is a screen shot of the automator workflow.

FIG. 10 is a screen shot showing an example of a workflow when viewed using Apple Computer, Inc.'s Automator application. The Automator application, which is supplied as part of the Mac OS X operating system, provides a simple graphical programming capability. Such an environment provides a convenient, easy to use environment for viewing and modifying workflows created using the present invention. However, those skilled in the art will understand that other third party graphical programming environments could be used or adapted for use with the present invention or such an environment could be created specifically for use with multimedia controller 100.

In FIG. 10, the panels numbered 1000, 1002 represent discrete actions which are to be executed consecutively. For example, in panel 1000, the specified action is to turn on the power to an Integra model DPS-5.5 DVD player. In panel 1002, the specified action is to turn on the power to an Integra model DTR-10.5 receiver.

Figure 11:
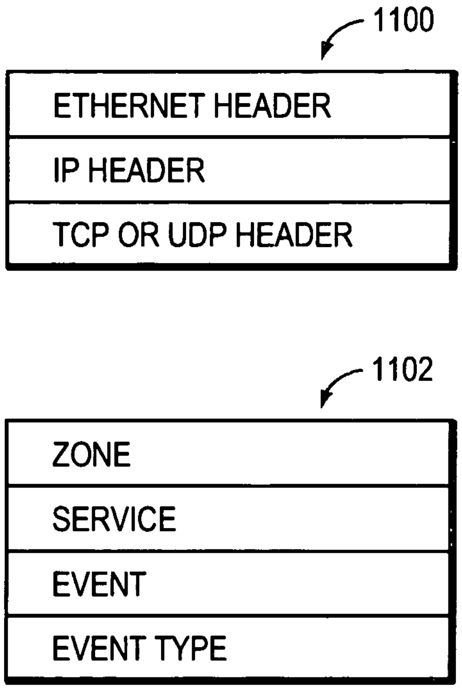
FIG. 11 is a diagram of a message structure for an application programming interface (API) for the controller of FIG. 1.

FIG. 11 is a diagram of a message structure for an application programming interface (API) for the controller of FIG. 1. Each message includes a header portion 1100, which may implemented using any of Ethernet, IP, TCP or UDP header. Header portion 1100 is followed by a payload portion 1102. Payload portion 1102 includes information which identifies a zone, service, event and event type. Payload portion 1102 may implemented simply as variable length strings of ASCII characters, but may also be implemented using any of a variety of other well known data types or structures.

Figure 12:
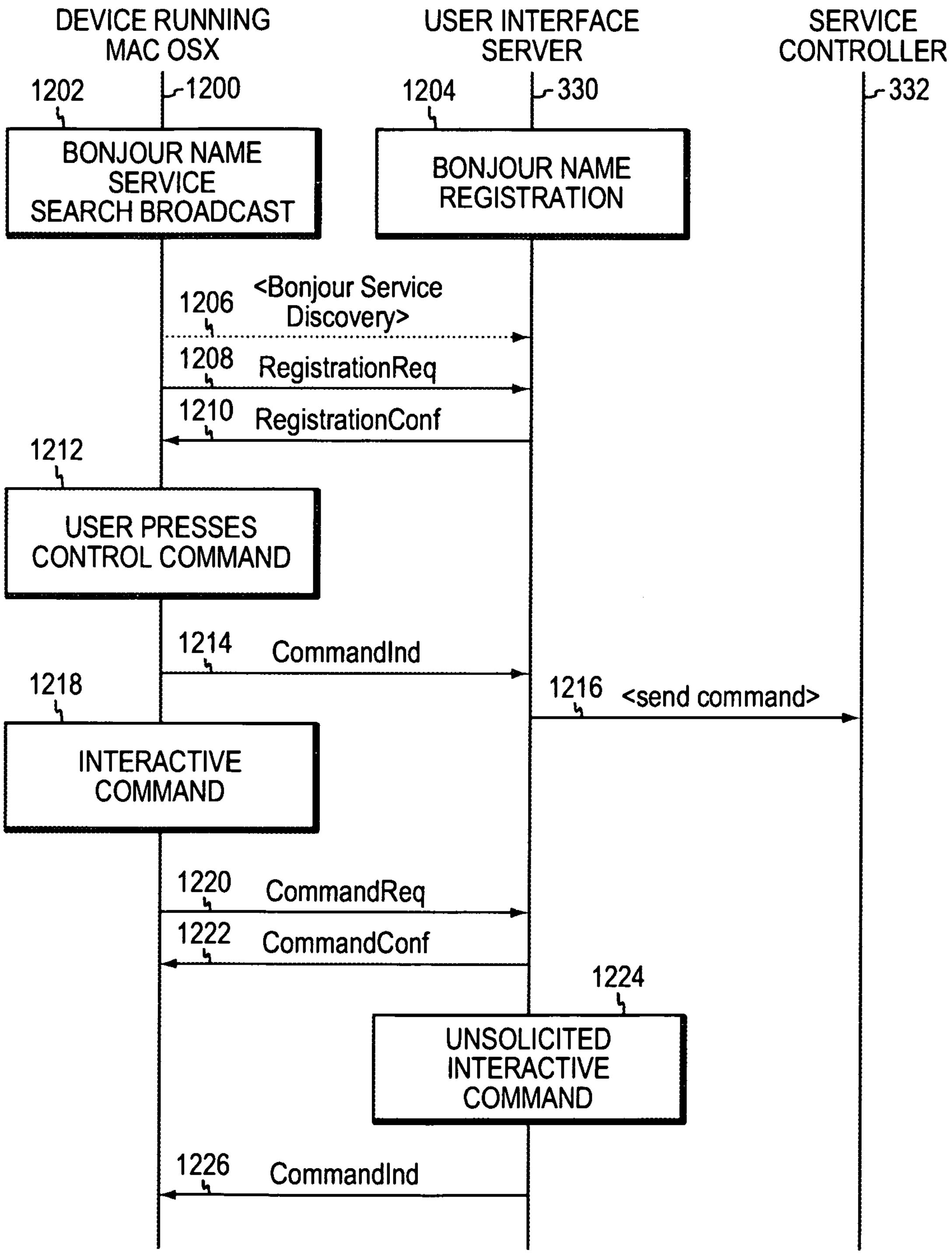
FIG. 12 is a message flow diagram showing how a device running Mac OS X interacts with the API of FIG. 11.

FIG. 12 is a message flow diagram showing how a device running Mac OS X interacts with the API of FIG. 11 and is used to control the operation of multimedia controller 100. A device running Mac OS X is denoted by reference number 1200. In a preferred embodiment, device 1200 will initially attempt to autodetect a server (i.e., interface server 330 (FIG.

3)) by way of the Bonjour Name Service search broadcast 1202 which is part of OS X. User interface server 330 includes Bonjour Name Registration 1204. A Bonjour Service Discovery message 1206 is issued by device 1200 and received by user interface server 330. This is followed by a registration request 1208 which is processed by Bonjour Name Registration 1204 and acknowledged by way of registration confirmation message 1210.

Once device 1200 is registered, subsequently, a user presses a button 1212 (e.g., increase the volume on the TV) which causes a command indication 1214 to be issued to user interface server 330. Command indication 1214, as well as command request 1220, command confirmation 1222 and command indication 1226, would, in general, be constructed in accordance with the message structure shown in FIG. 12.

User interface server 330 recognizes command indication 1214 as a control command or request and responds by issuing a send command message to service controller 332 (FIG. 3) which reacts according to the applicable service implementation to raise the volume on the TV.

In the case of an interactive command 1218 (e.g., a user wishes to view album cover art), which requires data from user interface server 330, a command request 1220 is issued by device 1200 to user interface server 330. User interface server 330 replies with a command confirmation 1222 which returns the requested data to device 1200.

In the case of an unsolicited interactive command 1224 (e.g., a user loads a DVD into a DVD player or disconnects a component), user interface server 330 simply issues a command indication 226 to inform device 1200 of the event.

Figure 13:
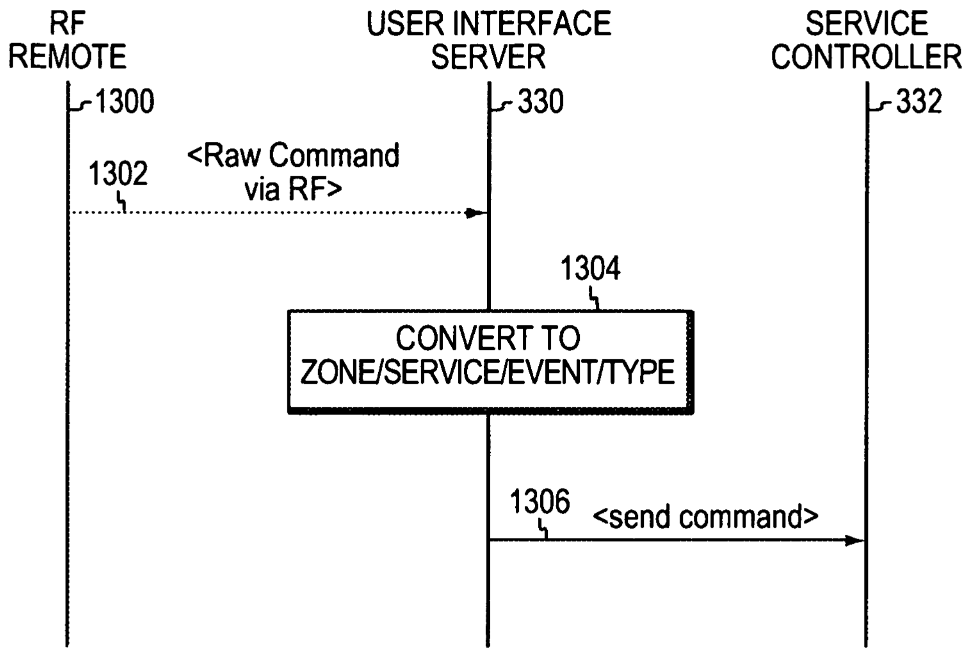
FIG. 13 is message flow diagram showing how a remote control which transmits radio frequency (RF) commands interacts with the API of FIG. 11.

FIG. 13 is message flow diagram showing how device 1300, such as a remote control, which transmits radio frequency (RF) commands interacts with the API of FIG. 11. A "raw" RF command 1302 is initially transmitted by device 1300. User interface server 330 received the RF command and converts 1304 it to a zone/service/event/event type message like that shown in FIG. 11. The converted message is then sent 1306 to service controller 332 which reacts according the applicable service implementation.

Figure 14:
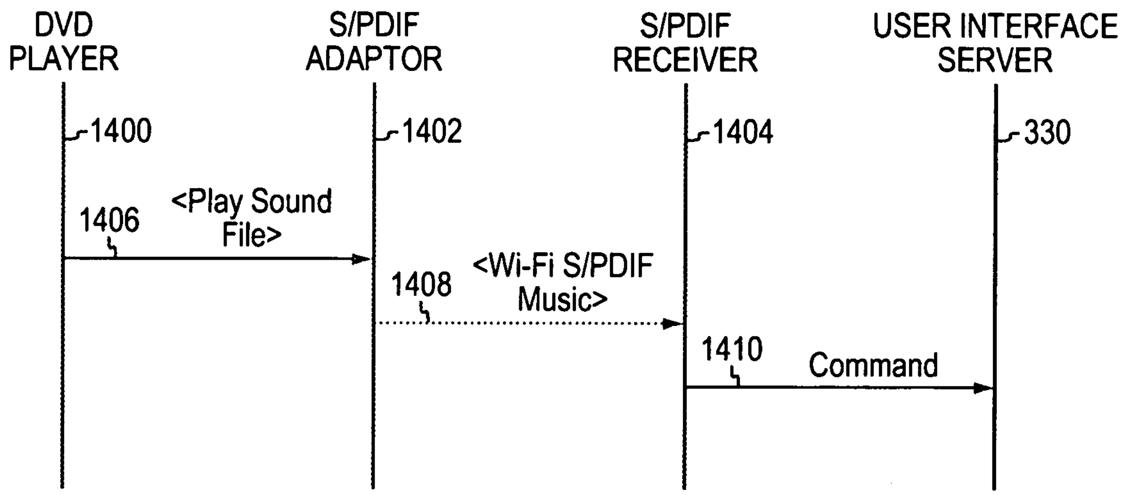
FIG. 14 is a message flow diagram showing how a DVD player with S/PDIF output may be used a control device with the API of FIG. 11.

FIG. 14 is a message flow diagram showing how a DVD player with a Sony/Philips Digital Interconnect format (S/PDIF) output may be used a control device with the API of FIG. 11. A conventional DVD player (or simply a video decoder chip which implements the basic functionality of a DVD player) 1400 is supplied with a special DVD that may contain, for example, an interactive or menu-driven video which presents a series of menus, a system "control panel" or similar control options to a user. As described in detail in the copending application referenced above, as the user chooses control options, DVD player 1400 responds by producing an output audio stream in which control information is embedded. The S/PDIF output sound file is converted by an adaptor 1402 to WiFi S/PDIF music 1408 which is transmitted wirelessly to an S/PDIF receiver 1404 which part of multimedia controller 100 (FIG. 1). Receiver 1404 converts the received S/PDIF music 1408 to a command 1410 which passed to user interface server 330.

Examples of Services

We will now describe representative examples of services that may be implemented using the present invention. It will be understood by those skilled in the art that the following description is by way of example only and that the present invention is capable of providing far more services, both in type and quantity, beyond the specific examples described here.

Video-Related Services

A service which provides videoconferencing, including multiparty videoconferences, may be created and used with the present invention. Video signals and audio signals for a video conference may originate from either the internet 140 (FIG. 1), PSTN 130 or another source which is interfaced with multimedia controller 100. If desired, video signals may be carried over the internet while corresponding audio signals are carried by the PSTN. This arrangement provides superior audio quality as compared to a videoconference in which the audio signals are carried over the internet.

Another service which the present invention supports is video chat, including multiparty chat. Such a service may be based in whole or in part on iChat or similar functionality available from third parties.

Another service which the present invention supports is video mail, which may be thought of as email in which the content is video as opposed to text or graphics.

Another service which the present invention supports is video with integrated telephony features. Such a service provides a "picture in picture" display on a television or other display device for showing caller ID or other information relating to an incoming call. Such as service may also provide display of text messages or provide unified messaging through a single in-box in which a user would receive email, video mail, voicemail, fax, etc.

Another service which the present invention supports is video on demand (VoD) or video podcasting in either high definition or standard definition.

Another service which the present invention supports is video processing including one more of the following functions: color space conversion; flexible input capture size, adjustable gamma conversion; keying; motion processing; zoning; diagonal compensation; multiple live inputs; 3D noise reduction; alpha blending; intelligent image sharpening; seamless switching; video upconversion; video scaling and resizing; HDDVD recording, playback and editing; DVD playback; DVR/PVR capabilities; MPEG decoding/encoding; video transcoding; and surround sound decoding (i.e., Dolby and DTS).

In general, any of the foregoing or other video-related services may be created to work with any of the major digital video encoding standards including MPEG-2, MPEG-4 AVC, DivX, JPEG, BMP and PNG for images.

Messaging-Related Services

A service which provides instant messaging is supported by the present invention. Such a service may also provide short message service (SMS) functionality.

Audio-Related Services

A service which the present invention supports provides one or more of the following radio functions: internet radio; high definition radio; FM; AM; and satellite radio.

Another service which the present invention supports is a digital jukebox including the ability to create "smart" playlists based on user preferences. Such a service may include organization and display of metadata relating to artist and title as well as automatic retrieval of such metadata over the internet (e.g., Gracenote® MusicID or other service).

Another service which the present invention supports is karaoke, which may be implemented with either wired or wireless microphones.

Another service which the present supports is speech recognition/synthesis, the basic functionality of which is part of the Mac OS X operating system. Such a service may also be based in whole or in part on third party speech recognition/synthesis which is compatible with multimedia controller 100.

Games-Related Services

A service which the present invention supports is interactive games including on-line games and whole-house games.

Home Automation and Security-Related Services

A service which the present invention supports is security including remote surveillance over the internet, intelligent security, alarm system control, lighting control, HVAC control, sprinkler system control and use of DVR/PVR for security video recording.

The present invention also supports a service for remote monitoring and detection of a user's health as well as telemedicine.

Configuration, Management and Control-Related Services

As discussed in detail above, the present invention provides substantial assistance and convenience to a user in connection with configuration of multimedia controller 100 through an on-screen tutorial and the like. Once a system is initially configured and running, the present invention supports a service in which whenever a computer or other device which may contain digital media is connected to multimedia controller 100, designated folders or areas of that computer or device may be scanned for new media not already available to the controller. Any new media may be automatically downloaded to the controller and stored according to a library or other organization specified by the user.

Similarly, the present invention supports a service in which multimedia controller 100 is always on/always monitoring and automatically discovers and identifies new components when they are interfaced with the controller. In addition, once a new component is identified, such a service may advise the user through on-screen information, e-mail or other media that the new component is recognized and further advise as to new services which the user may wish to activate to make use of the component.

Another service which the present invention supports is control of live and recorded TV including time shifting.

Another service which the present invention supports is remote synchronization of portable devices including portable audio and video players, PDAs, computers and the like. Similarly, the present invention supports a service in which remote content is scheduled for retrieval and storage on DVR/PVR.

Digital Music-Related Services

The present invention supports a service for recording audio either live or from another source. Such a service may be based in whole or in part on GarageBand from Apple Computer.

Another service which the present invention supports is integration with music purchasing services including iTunes music store, Napster ToGo, Yahoo! Music and the like.

Another service which the present invention supports is a DJ mixing platform including one or more of the following functions: automatic mixing; one-click beat-matching; seamless looping; automatic BPM counter; vinyl simulation including scratch, pitch, and reverse play; separate headphones output and song pre-listening; and mix recording.

Another service which the present invention supports is an e-music studio including one or more of the following functions: route; map; filter; convert; display; input and output MIDI messages in realtime.

Another service which the present invention supports is an internal drum machine and loop generator.

Another service which the present invention supports is an interactive on-screen display chord book generator;

Another service which the present invention supports is integrated musician tools including one or more of the following capabilities: guitar tuner; chromatic and tonal; alternate tuning editor; chord library; tablature organizer; jam machine; and metronome. Such a service may also include music collaboration and playing which may be based in whole or in part on eJamming™ or other third party software.

Digital Media Server-Related Services

The present invention supports a service which provides a digital media hub with integrated digital media adapter. Such a service may also provide a digital media server capable of serving video, audio, digital photos, data, voice and supporting major audio compression techniques including MP3, AAC, Apple Lossless Compression, FLAC, Ogg Vorbis and Monkey's Audio Whole-House Digital Media Distribution-Related Services The present invention supports a service which provides one or more of the following functionalities: whole-house audio including multi-zone whole-house audio distribution; whole-house video including multi-zone whole-house video distribution; whole-house games including multi-zone whole-house gaming distribution; and whole-house visualizer for distributing different visualizers to different zones (rooms) playing different music (audio) content independently. Such a service may also provide whole-house digital alarm clock and reminder functionality including displaying reminders or performing automated tasks; integration with Digital Jukebox (QuickTime/iTunes); playing media files, web broadcasts and CDs/DVDs; performing wake-up and reminder prompts with user specified digital media content including internet radio, MP3 and Digital Jukebox Playlist; and automatically composing/sending email including video mail reminders.

VOIP/Telephony/IP PBX-Related Services

The present invention supports a service which provides voice over IP (VoIP) capabilities including integrated analog telephony adapter (ATA), IP private branch exchange (PBX) and IP key system. Such a service may also provide intelligent call screening, voice activated dialing, color ring back tone integration, follow-me/find me service and inbound/outbound call management.

For handling incoming phone calls, a service may be implemented in which the caller ID information is collected (this capability is present in telephone interface 270 (FIG. 2) which includes an FXO interface, as described in the copending application). The service may report or display the caller ID information to one or more user interfaces as desired. In addition, using the caller ID information, a lookup may be performed in a user's address book to determine if the calling party is listed there. If there is a match in the address book, the multimedia controller 100 may display at the user interface the calling party's name, picture or other information instead of or in addition to the phone number. Advantageously, the user is not required to do anything other than operate a telephone set in the customary manner.

For handling outgoing phone calls, once a telephone set is taken off hook and a user begins to dial, the digits may be collected (DTMF tone detection capability is present in telephone interface 270 which includes an FXS interface). Again, a lookup to the user's address book will determine if the call is being placed to someone listed in the book. If so, the user may now be offered particular options (these may be simply announced to the user over the phone or displayed on a video display), associated with the party who is being called, for completing the call. For example, if the address book shows that the party who is being called has videophone capability, a Skype account, iChat or similar service, the user may select any of those options to complete the call. The user may select a call completion option by simply pressing a button on the phone, making a selection on a touchscreen or through any of a number of other user interfaces supported by the present invention. Again, the user is not required to know any special commands or complicated operational steps because he or she is simply using a telephone in the customary way.

Other services may also be implemented where a user operates a telephone in the normal fashion, but is enabled to open or close a gate, a garage door, lights and the like.

Online-Related Services

The present invention supports a service which provides a personal assistant or concierge service for obtaining, organizing and displaying entertainment-related or other information within the home or other setting. Such a service may provide for on-screen display or other user specified media information on weather, sports, stocks, on-line ticket purchases, online reservations, email, shopping list creation and synchronization with PDA or other portable devices, recipes and traffic reports including video.

While certain embodiments of the present invention described above make use of various functionalities provided by the Mac OS X operating system (e.g., Automator, Applescript), the present invention does not require that particular operating system in any way. The present invention, including in particular the programmable services aspect of the invention, may be implemented in connection with any desired operating system including without limitation Windows and Linux.

The foregoing description has been directed to particular embodiments of this invention. It will be apparent, however, that other variations and modifications may be made to the described embodiments, with the attainment of some or all of their advantages. Additionally, the procedures or processes may be implemented in hardware, software, embodied as a computer-readable medium having program instructions, firmware, or a combination thereof. Therefore, it is the object of the appended claims to cover all such variations and modifications as come within the true spirit and scope of the invention.

What is claimed is:

1. A system comprising:

one or more controllers coupled to the one or more components; and a processing subsystem of said controllers configured to execute a programming environment, the programming environment to include:

at least one component profile which includes information regarding a physical characteristic of a predetermined component which may be interfaced with said controller, one or more commands that said predetermined component recognizes, and one or more functions that said predetermined component is capable of performing, at least one zone configuration which includes information regarding an identification of a plurality of components that are present in one or more predetermined zones, how those present components are interconnected, and types of any controllers available to the user in said predetermined zones, a connection configuration which includes information regarding how present components are interconnected, at least one service rule which includes information regarding what component functions are needed to implement a predetermined programmable service and how present components providing said functions will interact to provide said predetermined service, a configuration compiler executed by the processing subsystem, that is configured to receive as an input said at least one component profile, zone configuration, connection configuration and service rule, and which is configured to generate as an output a service implementation that describes in machine-readable markup language how to utilize a particular group of present components to provide said predetermined service, and a workflow generator that is configured to generate, responsive to said service implementation, a set of graphical workflows that graphically represent requests of said service implementation, and to generate an executable program corresponding to each of said graphical workflows, said graphical workflows viewable by a user in an application and including a plurality of panels that represent discrete actions that are executed, said executable program being executable on said one or more controllers to provide said request of said predetermined service using one or more of said present components.

2. The system as in claim 1 wherein said at least one component profile includes a description of one or more physical inputs or outputs of said predetermined component.

3. The system as in claim 2 wherein said description of one or more physical inputs or outputs includes information regarding connector type and signal type.

4. The system as in claim 1 wherein said at least one component profile includes a description of one or more messages which said predetermined component may generate to report an action or status.

5. The system as in claim 1 wherein said at least one component profile includes information regarding removable modules which may be contained within said predetermined component.

6. The system as in claim 1 wherein said at least one component profile includes information regarding one or more functions which said predetermined component is capable of performing.

7. The system as in claim 1 wherein said at least one zone configuration includes a description of user-assigned options for components present in said one or more predetermined zones.

8. The system as in claim 1 wherein said connection configuration includes a description of one or more physical connections between one or more inputs or outputs of at least one present component and one or more inputs or outputs of a controller of said one or more controllers.

9. The system as in claim 1 wherein said connection configuration includes a description of one or more physical connections between one or more inputs or outputs of at least two present components.

10. The system as in claim 1 wherein said at least one component profile comprises an Extensible Markup Language (XML) file.

11. The system as in claim 1 wherein said at least one zone configuration comprises an Extensible Markup Language (XML) file.

12. The system as in claim 1 wherein said connection configuration comprises an Extensible Markup Language (XML) file.

13. The system as in claim 1 wherein said at least one service rule comprises an Extensible Markup Language (XML) file.

14. The system as in claim 1 wherein said at least one component profile is provided in a library, and said connection configuration is based on logical interconnections made between selected components in a graphical programming environment.

15. The system as in claim 1 wherein said processing subsystem comprises at least two general purpose computers having separate data storage capacities, and a first one of said computers has a primary responsibility for performing processing necessary to implement said predetermined service and a second one of said computers has a secondary responsibility for performing processing necessary to implement said predetermined service, and the said second one of said computers is configured to assume primary responsibility in the event said first one of said computers fails.

16. The system as in claim 1 wherein said predetermined service is videoconferencing performed in conjunction with a television, a telephone, internet and a public switched telephone network.

17. A method comprising:

applying, by a processor, one or more service rules to component profiles that include information regarding physical characteristics of components, commands recognized by said components, or functions that said components are capable of performing, a zone configuration that includes an indication of components that are present in one or more predetermined zones, and a connection configuration that includes information regarding how present components are interconnected, to produce a service implementation; and creating a set of graphical workflows from said service implementation, each of said graphical workflows visible to a user in an application executed on said processor and including a plurality of panels that represent discrete actions that are executed, and for each graphical workflow generating an executable program corresponding to said graphical workflow, said executable program being executable on a controller coupled to said present components to implement a request of said programmable service using one or more of said present components.

18. The method of claim 17, further comprising:

receiving edits to one of said graphical workflows from the user; and in response to said edits, cause said executable program corresponding to said one of said graphical workflows to be modified.

19. The method of claim 17, wherein said service implementation describes in machine-readable markup language how to utilize a group of components to provide said programmable service.

20. A system comprising:

a controller coupled to the one or more components; and a processor configured to execute a programming environment, the programming environment to include:

one or more component profiles that include information regarding physical characteristics of components, commands recognized by said components, or functions that said components are capable of performing, a zone configuration that includes an indication of components that are present in one or more predetermined zones, a connection configuration that includes information regarding how present components are interconnected, and a configuration compiler configured to apply one or more service rules to said one or more component profiles, said zone configuration, and said connection configuration, to produce a service implementation, and from said service implementation to generate a set of graphical workflows visible to a user, and for each graphical workflow to generate an executable program corresponding to said graphical workflow that is executable on said controller to implement a request of said programmable service using one or more of said present components.

21. The system of claim 20, wherein said programming environment is further configured to, in response to edits to one of said graphical workflows received from the user, cause said executable program corresponding to said one of said graphical workflows to be modified.

22. The system of claim 20, wherein said service implementation describes in machine-readable markup language how to utilize a group of present components to provide said programmable service.

* * * * *

UNITED STATES PATENT AND TRADEMARK OFFICE

CERTIFICATE OF CORRECTION

PATENT NO. : 9,153,125 B2
APPLICATION NO. : 11/314112
DATED : October 6, 2015
INVENTOR(S) : Robert P. Madonna et al.

It is certified that error appears in the above-identified patent and that said Letters Patent is hereby corrected as shown below:

In the Specification:
Col. 8, line 64 should read:
cameras, iPods) are connected to the primary computer. Data Col. 12, line 25 should read:
CD in a DVD player where the DVD player is connected to Col. 14, line 32 should read:
tions: color space conversion; flexible input capture size;

Col. 14, line 37 should read:
and resizing; HD DVD recording, playback and editing; DVD Col. 16, line 33 should read:
voice over IP (VOIP) capabilities including integrated analog Signed and Sealed this
Third Day of May, 2016

Michelle K. Lee

Michelle K. Lee
*Director of the United States Patent and Trademark Office*